United States Patent
Kim et al.

(10) Patent No.: US 11,456,458 B2
(45) Date of Patent: Sep. 27, 2022

(54) NICKEL-BASED ACTIVE MATERIAL PRECURSOR FOR LITHIUM SECONDARY BATTERY, PREPARING METHOD THEREOF, NICKEL-BASED ACTIVE MATERIAL FOR LITHIUM SECONDARY BATTERY FORMED THEREOF, AND LITHIUM SECONDARY BATTERY COMPRISING POSITIVE ELECTRODE INCLUDING THE NICKEL-BASED ACTIVE MATERIAL

(71) Applicant: SAMSUNG SDI CO., LTD., Yongin-si (KR)

(72) Inventors: Doyu Kim, Yongin-si (KR); Donggyu Chang, Yongin-si (KR); Jongmin Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 27 days.

(21) Appl. No.: 17/183,295

(22) Filed: Feb. 23, 2021

(65) Prior Publication Data

US 2021/0202941 A1    Jul. 1, 2021

Related U.S. Application Data

(63) Continuation-in-part of application No. 15/836,311, filed on Dec. 8, 2017, now Pat. No. 11,309,542.

(30) Foreign Application Priority Data

Oct. 29, 2020    (KR) .................. 10-2020-0142522

(51) Int. Cl.
*H01M 4/525*    (2010.01)
*H01M 4/58*    (2010.01)
(Continued)

(52) U.S. Cl.
CPC ............ *H01M 4/525* (2013.01); *C01G 53/04* (2013.01); *C01G 53/50* (2013.01); *H01M 4/364* (2013.01);
(Continued)

(58) Field of Classification Search
CPC ...... H01M 4/131; H01M 4/136; H01M 4/364; H01M 4/366; H01M 4/525; H01M 4/5825; H01M 2004/021; C01G 53/50
See application file for complete search history.

(56) References Cited

U.S. PATENT DOCUMENTS

| | | | |
|---|---|---|---|
| 8,486,564 B2 | 7/2013 | Nagai et al. | |
| 8,728,666 B2 | 5/2014 | Itou et al. | |

(Continued)

FOREIGN PATENT DOCUMENTS

| | | | |
|---|---|---|---|
| CN | 101002351 A | 7/2007 | |
| CN | 101167209 A | 4/2008 | |

(Continued)

OTHER PUBLICATIONS

U.S. Notice of Allowance dated Jun. 24, 2021, issued in U.S. Appl. No. 15/836,311 (8 pages).

(Continued)

*Primary Examiner* — Brittany L Raymond
(74) *Attorney, Agent, or Firm* — Lewis Roca Rothgerber Christie LLP

(57) ABSTRACT

A nickel (Ni)-based active material for a lithium secondary battery, a preparing method thereof, and a lithium secondary battery including a positive electrode including the same. The Ni-based active material includes a secondary particle including a plurality of particulate structures, wherein each of the particulate structures includes a porous core portion and a shell portion including primary particles radially arranged on the porous core portion, and lithium phosphate (Continued)

is in the porous core portion, between the plurality of primary particles, and on the surface of the secondary particle. The Ni-based active material includes a porous inner portion including the porous core portion; and an outer portion comprising the the shell portion, and the Ni-based active material includes the porous inner portion having closed pores and the outer portion, wherein the porous inner portion has a density less than that of the outer portion, and the Ni-based active material has a net density of 4.7 g/cc or less.

28 Claims, 26 Drawing Sheets

(51) Int. Cl.
| | |
|---|---|
| H01M 4/505 | (2010.01) |
| H01M 4/36 | (2006.01) |
| C01G 53/04 | (2006.01) |
| C01G 53/00 | (2006.01) |
| H01M 10/0525 | (2010.01) |
| H01M 4/02 | (2006.01) |

(52) U.S. Cl.
CPC ........... *H01M 4/366* (2013.01); *H01M 4/505* (2013.01); *H01M 4/5825* (2013.01); *H01M 10/0525* (2013.01); *C01P 2002/74* (2013.01); *C01P 2004/03* (2013.01); *H01M 2004/021* (2013.01); *H01M 2004/028* (2013.01)

(56) References Cited

U.S. PATENT DOCUMENTS

| | | | |
|---|---|---|---|
| 9,337,487 | B2 | 5/2016 | Sun et al. |
| 9,450,229 | B2 | 9/2016 | Uwai et al. |
| 9,559,351 | B2 | 1/2017 | Mori et al. |
| 9,577,254 | B2 | 2/2017 | Nagai |
| 9,601,770 | B2 | 3/2017 | Park et al. |
| 9,899,674 | B2 | 2/2018 | Hirai et al. |
| 10,020,507 | B2 | 7/2018 | Kobayashi et al. |
| 10,396,356 | B2 | 8/2019 | Toya et al. |
| 10,833,329 | B2 | 11/2020 | Kim et al. |
| 2009/0029253 | A1* | 1/2009 | Itou .................. H01M 10/0525 429/223 |
| 2012/0231322 | A1 | 9/2012 | Chu et al. |
| 2013/0045421 | A1 | 2/2013 | Kobino et al. |
| 2014/0087265 | A1 | 3/2014 | Yura et al. |
| 2014/0205898 | A1 | 7/2014 | Lee et al. |
| 2014/0335417 | A1 | 11/2014 | Nagai |
| 2015/0064557 | A1 | 3/2015 | Kim et al. |
| 2015/0086787 | A1 | 3/2015 | Yura et al. |
| 2015/0093580 | A1* | 4/2015 | Kobayashi ............ H01M 4/525 428/403 |
| 2016/0036041 | A1* | 2/2016 | Uwai .................... C01G 53/50 429/231.1 |
| 2016/0079597 | A1 | 3/2016 | Fujiki et al. |
| 2016/0181597 | A1 | 6/2016 | Kim et al. |
| 2016/0190573 | A1 | 6/2016 | Sun et al. |
| 2017/0207453 | A1 | 7/2017 | Oda |
| 2017/0222221 | A1* | 8/2017 | Park .................... C01G 53/50 |
| 2017/0352885 | A1 | 12/2017 | Kondo et al. |
| 2018/0026267 | A1 | 1/2018 | Kim et al. |
| 2018/0026268 | A1 | 1/2018 | Kim et al. |
| 2018/0108940 | A1* | 4/2018 | Kwon .................... C01G 53/50 |
| 2018/0219216 | A1 | 8/2018 | Choi et al. |
| 2019/0148721 | A1 | 5/2019 | Park et al. |
| 2019/0173076 | A1 | 6/2019 | Kim et al. |
| 2019/0260024 | A1* | 8/2019 | Nakamura ............ C01G 53/50 |
| 2020/0028168 | A1 | 1/2020 | Ju et al. |
| 2020/0185709 | A1 | 6/2020 | Zhou et al. |
| 2020/0185714 | A1 | 6/2020 | Han et al. |

FOREIGN PATENT DOCUMENTS

| | | |
|---|---|---|
| CN | 102576873 A | 7/2012 |
| CN | 104303345 A | 1/2015 |
| CN | 104521039 A | 4/2015 |
| CN | 105051952 A | 11/2015 |
| CN | 105070896 A | 11/2015 |
| CN | 105453311 A | 3/2016 |
| EP | 2882013 A1 | 6/2015 |
| EP | 2975680 A1 | 1/2016 |
| EP | 3272710 A1 | 1/2018 |
| EP | 3734720 A1 | 11/2020 |
| JP | 2001-243951 A | 9/2001 |
| JP | 2012-254889 A | 12/2012 |
| JP | 2013-118156 A | 6/2013 |
| JP | 2013-206556 A | 10/2013 |
| JP | 2014-67645 A | 4/2014 |
| JP | 2015-72800 A | 4/2015 |
| JP | 2015-76397 A | 4/2015 |
| JP | 2016-4703 A | 1/2016 |
| JP | 2016-127004 A | 7/2016 |
| JP | 2018-14325 A | 1/2018 |
| JP | 6705068 B1 | 6/2020 |
| JP | 2020-102432 A | 7/2020 |
| KR | 10-2009-0126962 A | 12/2009 |
| KR | 10-2010-0099337 | 9/2010 |
| KR | 10-2012-0103263 A | 9/2012 |
| KR | 10-2014-0093529 | 7/2014 |
| KR | 10-2015-0016125 A | 2/2015 |
| KR | 10-2015-0026863 A | 3/2015 |
| KR | 10-2015-0090963 A | 8/2015 |
| KR | 10-2015-0119876 A | 10/2015 |
| KR | 10-2015-0122172 A | 10/2015 |
| KR | 10-2016-0032664 A | 3/2016 |
| KR | 10-2016-0041039 | 4/2016 |
| KR | 10-2016-0049995 A | 5/2016 |
| KR | 10-2017-0096673 A | 8/2017 |
| KR | 10-2018-0010122 A | 1/2018 |
| KR | 10-1886514 B1 | 8/2018 |
| KR | 10-2019-0032248 A | 3/2019 |
| KR | 10-2019-0065963 A | 6/2019 |
| KR | 10-2019-0078498 A | 7/2019 |
| KR | 10-2020-0019571 A | 2/2020 |
| KR | 10-2020-0033354 A | 3/2020 |
| KR | 10-2020-0044448 A | 4/2020 |
| KR | 10-2020-0070649 A | 6/2020 |
| KR | 10-2020-0090727 A | 7/2020 |
| WO | WO 2006/010894 A1 | 2/2006 |
| WO | WO 2011/086690 A1 | 7/2011 |
| WO | 2012/131881 A1 | 10/2012 |
| WO | WO 2012/131779 A1 | 10/2012 |
| WO | WO 2014/061399 A1 | 4/2014 |
| WO | WO 2014/142279 A1 | 9/2014 |
| WO | WO 2015/108163 A1 | 7/2015 |
| WO | WO 2016/060451 A1 | 4/2016 |
| WO | WO 2016/068594 A1 | 5/2016 |
| WO | WO 2016/175597 A1 | 11/2016 |

OTHER PUBLICATIONS

U.S. Notice of Allowance dated Aug. 24, 2021, issued in U.S. Appl. No. 15/836,311 (8 pages).
U.S. Notice of Allowance dated Apr. 28, 2021, issued in U.S. Appl. No. 15/654,648 (8 pages).
Yan, Pengfei, et al., "Tailoring of Grain Boundary Structure and Chemistry of Cathode Particles for Enhanced Cycle Stability of Lithium Ion Battery," 2018, 22 pages.
Lee, Yongho, et al., "Facile formation of a Li3PO4 coating layer during synthesis of a lithium-rich layered oxide for high-capacity lithium ion batteries," Journal of Power Sources, vol. 315, 2016, pp. 284-293.
U.S. Notice of Allowance dated Mar. 12, 2021, issued in U.S. Appl. No. 15/836,311 (13 pages).
Japanese Office Action dated Jul. 5, 2021, issued in Japanese Patent Application No. 2019-163717 (6 pages).
U.S. Notice of Allowance dated Aug. 6, 2021, issued in U.S. Appl. No. 15/654,648 (8 pages).

(56) References Cited

OTHER PUBLICATIONS

U.S. Notice of Allowance dated Dec. 6, 2021, issued in U.S. Appl. No. 15/654,648 (8 pages).
U.S. Notice of Allowance dated Dec. 9, 2021, issued in U.S. Appl. No. 15/836,311 (8 pages).
Korean Office Action, for Patent Application No. 10-2020-0142522, dated Feb. 3, 2022, 8 pages.
U.S. Advisory Action from U.S. Appl. No. 15/654,623, dated Jan. 27, 2022, 4 pages.
U.S. Restriction Requirement from U.S. Appl. No. 15/654,623, dated Jan. 4, 2019, 8 pages.
U.S. Restriction Requirement from U.S. Appl. No. 15/654,648, dated Feb. 25, 2019, 7 pages.
EPO Office Action dated Jun. 23, 2020, issued in European Patent Application No. 17182400.6 (6 pages).
Chinese Office Action, with English translation, dated Nov. 4, 2020, issued in Chinese Patent Application No. 201710595378.4 (18 pages).
Chinese Office Action, with English translation, dated Nov. 18, 2020, issued in Chinese Patent Application No. 201710595368.0 (19 pages).
EPO Third Party Observation dated Nov. 26, 2020, issued in European Patent Application No. 17182400.6 (11 pages).
Chinese Office Action, with English translation, dated Jul. 3, 2020, issued in corresponding Chinese Patent Application No. 201711293316.4 (18 pages).
Chinese Office Action, with English translation, dated Mar. 19, 2020, corresponding to Chinese Patent Application No. 201710595378.4 (16 pages).
Japanese Office Action dated Aug. 3, 2020, issued in corresponding Japanese Patent Application No. 2017-236042 (5 pages).
Japanese Office Action dated Aug. 31, 2020, issued in Japanese Patent Application No. 2019-163716(6 pages).
EPO Extended Search Report dated Nov. 14, 2017, for corresponding European Patent Application No. 17182400.6 (7 pages).
Kim et al., "A New Coating Method for Alleviating Surface Degradation of $LiNi_{0.6}Co_{0.2}Mn_{0.2}O_2$ Cathode Material: Nanoscale Surface Treatment of Primary Particles," Nano Letters, Feb. 2015, pp. 2111-2119, DOI: 10.1021/acs.nanolett.5b00045.
EPO Extended Search Report dated Dec. 4, 2017, corresponding to European Patent Application No. 17182408.9 (9 pages).
Japanese Office Action dated Aug. 6, 2018, corresponding to Japanese Patent Application No. 2017-140741 (4 pages).
Japanese Office Action dated Jan. 11, 2019, for corresponding Japanese Patent Application No. 2017-236042 (4 pages).
Lim et al., "Advanced Concentration Gradient Cathode Material with Two-Slope for High-Energy and Safe Lithium Batteries," Advanced Functional Materials, 2015, vol. 25, pp. 4673-4680.

Noh, Hyung-Joo et al., "Cathode Material with Nanorod Structure—An Application for Advanced High-Energy and Safe Lithium Batteries," Chemistry of Materials, 2013, vol. 25, pp. 2109-2115.
Zheng, Zhuo et al., "Uniform Ni-rich $LiNi_{0.6}Co_{0.2}Mn_{0.2}O_2$ Porous Microspheres: Facile Designed Synthesis and Their Improved Electrocheminal Performance," Electrochimica Acta, vol. 191, 2016, pp. 401-410.
EPO Extended Search Report dated Mar. 29, 2018, corresponding to European Patent Application No. 17206091.5 (7 pages).
Chinese Patent Office Action with English Translation for corresponding Chinese Patent Application No. 20170595368.0, dated Mar. 26, 2020, 25 pages.
European Patent Office Action for corresponding European Application No. 17 206 091.5, dated Jun. 18, 2019, 4 pages.
Korean Office Action dated Dec. 9, 2019, for corresponding Korean Patent Application No. 10-2017-0167526 (98 pages).
Japanese Notice of Allowance dated Nov. 24, 2020, issued in corresponding Japanese Patent Application No. 2017-236042 (3 pages).
U.S. Final Office Action dated Jun. 21, 2019, issued in U.S. Appl. No. 15/654,623 (10 pages).
U.S. Notice of Allowance dated Mar. 10, 2020, issued in U.S. Appl. No. 15/654,648 (8 pages).
U.S. Notice of Allowance dated Nov. 4, 2019, issued in U.S. Appl. No. 15/654,648 (10 pages).
U.S. Office Action dated Apr. 30, 2019, issued in U.S. Appl. No. 15/654,648 (17 pages).
U.S. Office Action dated Mar. 8, 2019, issued in U.S. Appl. No. 15/654,623 (11 pages).
Office Action issued in U.S. Appl. No. 15/654,623 by the USPTO, dated Feb. 12, 2020, 15 pages.
U.S. Final Office Action dated Aug. 6, 2020, issued in U.S. Appl. No. 15/654,623 (17 pages).
U.S. Notice of Allowance dated Sep. 24, 2020, issued in U.S. Appl. No. 15/654,648 (8 pages).
U.S. Advisory Action dated Oct. 13, 2020, issued in U.S. Appl. No. 15/654,623 (7 pages).
U.S. Notice of Allowance dated Jan. 14, 2021, issued in U.S. Appl. No. 15/654,648 (8 pages).
Office action from USPTO for U.S. Appl. No. 15/654,623, dated Mar. 24, 2022, 15 pages.
U.S. Office Action dated Apr. 2, 2021, issued in U.S. Appl. No. 15/654,623 (15 pages).
U.S. Final Office Action dated Oct. 4, 2021, issued in U.S. Appl. No. 15/654,623 (16 pages).
Zhang, Xu-Dong, et al., "An effective LiBO2 coating to ameliorate the cathode/electrolyte interfacial issues of LiNi0.6Co0.2Mn0.2O2 in solid-state Li batteries," Journal of Power Sources, vol. 426, 2019, pp. 242-249.

* cited by examiner

NICKEL-BASED ACTIVE MATERIAL PRECURSOR FOR LITHIUM SECONDARY BATTERY, PREPARING METHOD THEREOF, NICKEL-BASED ACTIVE MATERIAL FOR LITHIUM SECONDARY BATTERY FORMED THEREOF, AND LITHIUM SECONDARY BATTERY COMPRISING POSITIVE ELECTRODE INCLUDING THE NICKEL-BASED ACTIVE MATERIAL

CROSS-REFERENCE TO RELATED APPLICATION

This application is a continuation-in-part of U.S. patent application Ser. No. 15/836,311, filed on Dec. 8, 2017, which claims priority to and the benefit of Korean Patent Application Nos. 10-2016-0166888, filed on Dec. 8, 2016, and 10-2017-0167526, filed on Dec. 7, 2017, each in the Korean Intellectual Property Office, the disclosures of all of which are incorporated by reference herein in their entireties.

This application also claims priority to and the benefit of Korean Patent Application No. 10-2020-0142522, filed on Oct. 29, 2020, in the Korean Intellectual Property Office, the disclosure of which is incorporated by reference herein in its entirety.

BACKGROUND

1. Field

One or more embodiments relate to a nickel (Ni)-based active material precursor for a lithium secondary battery, a preparing method thereof, a Ni-based active material for a lithium secondary battery formed thereof, and a lithium secondary battery including a positive electrode including the nickel-based active material.

2. Description of Related Art

With the development of portable electronic devices, communication devices, and/or the like, there is a great need for the development of lithium secondary batteries having high energy density. However, a lithium secondary battery having high energy density may have poor safety, and thus there is a need to improve safety. As a positive active material for lithium secondary batteries, a lithium-nickel-manganese-cobalt composite oxide, a lithium-cobalt oxide, and/or the like has been utilized. However, when such a positive active material is utilized, the travel distance of lithium ions during charging and discharging is determined by the size of secondary particles, and thus charging and discharging efficiency is not high enough due to such physical distance. Furthermore, due to cracks occurring in primary particles by repeated charging and discharging of a lithium secondary battery, the lithium secondary battery may have a decreased lifespan, an increased resistance, and/or unsatisfactory capacity characteristics. Therefore, improvement in these characteristics is desired.

SUMMARY

An aspect according to one or more embodiments is directed toward a novel nickel (Ni)-based active material for a lithium secondary battery.

An aspect according to one or more embodiments is directed toward a method of preparing the Ni-based active material.

An aspect according to one or more embodiments is directed toward a lithium secondary battery having improved lifespan characteristics by including a positive electrode including the above-described Ni-based active material.

An aspect according to one or more embodiments is directed toward a Ni-based active material precursor utilized to form an Ni-based active material.

Additional aspects will be set forth in part in the description which follows and, in part, will be apparent from the description, or may be learned by practice of the presented embodiments of the disclosure.

According to one or more embodiments, a nickel (Ni)-based active material for a lithium secondary battery includes: a secondary particle including a plurality of particulate structures, wherein each of the particulate structures includes a porous core portion and a shell portion including primary particles radially arranged on the porous core portion, and lithium phosphate is present in the porous core portion, between the plurality of primary particles, and on the surface of the secondary particle, wherein the Ni-based active material includes a porous inner portion including the porous core portion, and an outer portion including the shell portion, and the porous inner portion includes closed pores and is less in density than the outer portion, and the Ni-based active material has a net density of 4.7 g/cc or less.

According to one or more embodiments, a lithium secondary battery includes a positive electrode including the Ni-based active material for a lithium secondary battery, a negative electrode, and an electrolyte interposed therebetween.

According to one or more embodiments, a nickel (Ni)-based active material precursor for a lithium secondary battery includes a secondary particle including a plurality of particulate structures, wherein each of the particulate structures includes a porous core portion and a shell portion including primary particles radially arranged on the porous core portion, phosphorus (P) is present in the porous core portion, between the plurality of primary particles, and on the surface of the secondary particle, and the phosphorus is in a range of 0.01 wt % to 2 wt % in content based on a total weight of the Ni-based active material precursor, wherein the Ni-based active material precursor comprises a porous inner portion comprising the porous core portion, and an outer portion comprising the shell portion; the porous inner portion comprises closed pores and is less in density than that the outer portion and the Ni-based active material precursor has a net density of 4.7 g/cc or less.

According to one or more embodiments, a method of preparing the nickel (Ni)-based active material for a lithium secondary battery includes mixing a lithium precursor and the Ni-based active material precursor to form a mixture, and conducting a primary heat treatment on the mixture under an oxidizing gas atmosphere at 600° C. to 800° C., wherein the Ni-based active material precursor includes a secondary particle including a plurality of particulate structures, wherein each of the particulate structures includes a porous core portion and a shell portion including primary particles radially arranged on the porous core portion, phosphorus (P) is present in the porous core portion, between the plurality of primary particles, and on the surface of the secondary particle, and the phosphorus is in a range of 0.01 wt % to 2 wt % in content based on a total weight of the Ni-based active material precursor.

BRIEF DESCRIPTION OF THE DRAWINGS

The above and other aspects, features, and enhancements of certain embodiments of the disclosure will be more apparent from the following description taken in conjunction with the accompanying drawings, in which:

FIG. 1A shows a state before coating phosphorus and FIG. 1B shows a state after coating phosphorus;

DETAILED DESCRIPTION

Figure 1A:
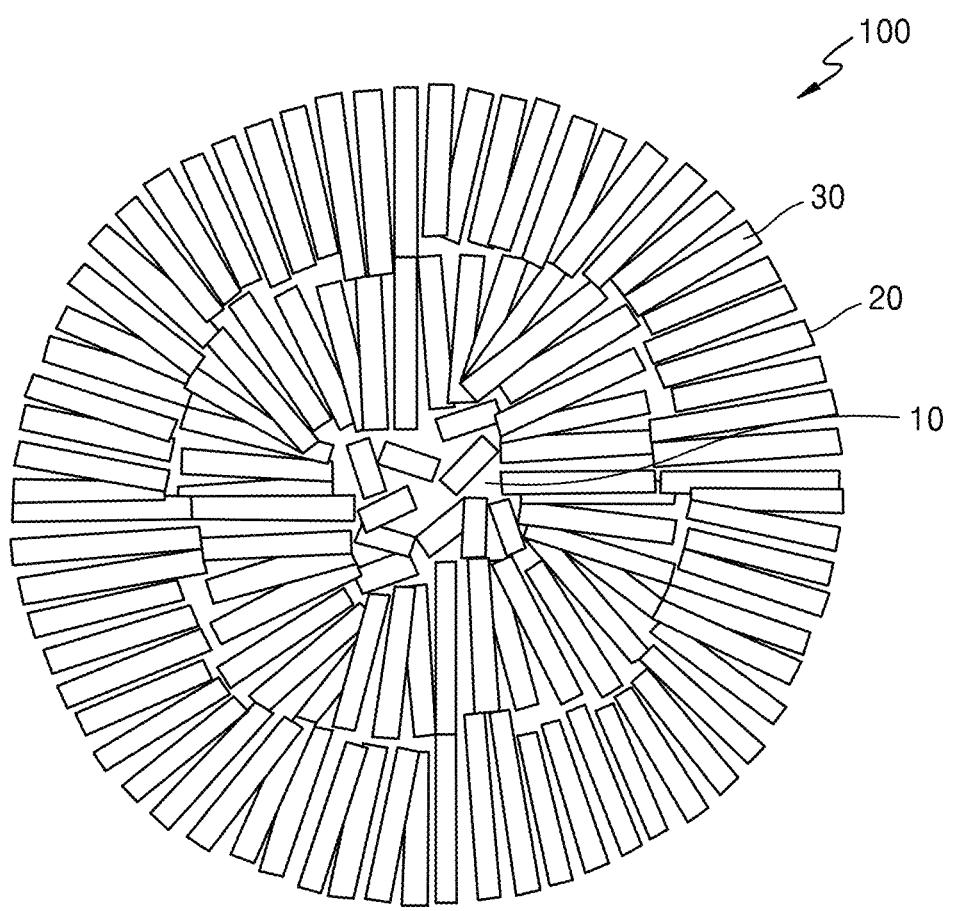
FIGS. 1A and 1B are schematic diagrams illustrating a cross-sectional structure of a Ni-based active material precursor according to an embodiment.

Reference will now be made in more detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, a nickel (Ni)-based active material for a lithium secondary battery, a preparing method thereof, a lithium secondary battery including a positive electrode including the same, and a Ni-based active material precursor for forming the Ni-based active material will be described in more detail. As those skilled in the art would understand, the following description of various embodiments of the present disclosure is provided for illustration purpose only and not for the purpose of limiting the present disclosure, and the scope of the present disclosure is only defined by the appended claims and their equivalents.

In the drawings, like reference numerals denote like elements, and elements may be enlarged or exaggerated for clarity. In addition, the aforementioned descriptions are only for illustrative purposes, and it will be apparent that those skilled in the art can make various suitable modifications thereto. In addition, in layered structures described below, when a layer is referred to as being "on" another layer, it can be directly on the other element or intervening elements may be present therebetween.

Provided is a nickel (Ni)-based active material precursor for a lithium secondary battery including a secondary particle including a plurality of particulate structures, wherein each of the particulate structures includes a porous core portion and a shell portion including primary particles radially arranged on the porous core portion, and phosphorus (P) is present in the porous core portion, between the plurality of primary particles, and on the surface of the secondary particle; wherein the phosphorus is in a range of 0.01 wt % to 2 wt % in content based on a total weight of the Ni-based active material precursor, and the Ni-based active material precursor comprises a porous inner portion comprising the porous core portion, and an outer portion comprising the shell portion; the porous inner portion comprises closed pores and is less in density than that the outer portion; and the Ni-based active material precursor has a net density of 4.7 g/cc or less. Here, the porous core portion is the porous inner portion, and the shell portion is the outer portion.

In this regard, the surface of the secondary particle includes surfaces of the plurality of primary particles.

The Ni-based active material precursor includes a porous inner portion having closed pores and an outer portion. In addition, the porous inner portion has a density less than that of the outer portion and the Ni-based active material precursor has a net density of 4.7 g/cc or less.

When the content of phosphorus is less than 0.01 wt % based on the total weight of the Ni-based active material precursor, improvement of electrochemical characteristics is insignificant. When the content of phosphorus is greater than 2 wt %, capacity decreases considerably.

As used herein, the term "phosphorus (P)" is interpreted to indicate phosphorus itself, or to include $PO_3^{2-}$ or $PO_4^{3-}$, or any combination thereof.

As used herein, the term "between the plurality of primary particles of the shell portion" may include grain boundaries of the plurality of primary particles.

As used herein, the term "particulate structure" refers to a structure formed by the aggregation of a plurality of primary particles.

Figure 1B:
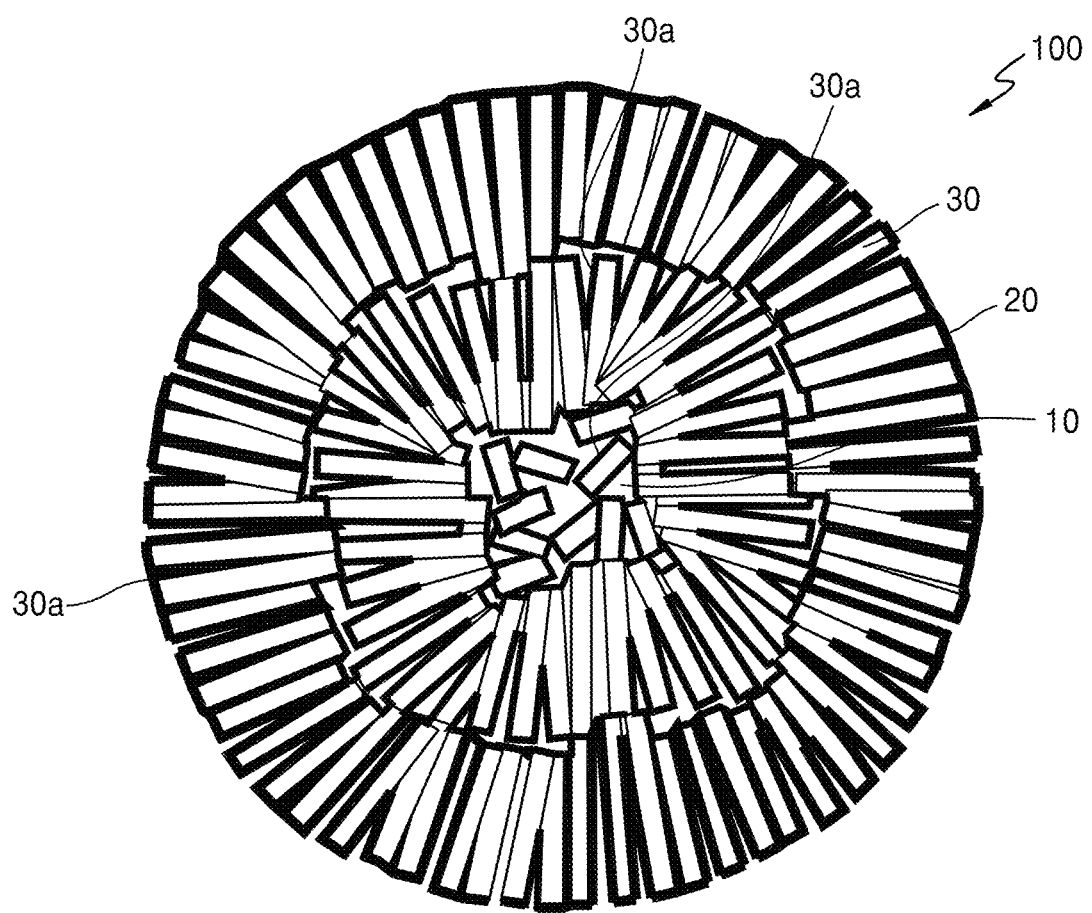

As used herein, the term "radially arranged" refers to a shape in which the major axes of primary particles included in the shell portion are arranged in a normal direction of the surface of the particulate structure or in a direction inclined from the normal direction by an angle of ±30° (e.g., by an angle within the range of ±30°) as shown in FIGS. 1A and 1B.

Forming a coating film utilizing lithium phosphate has been attempted to improve lifespan characteristics of the Ni-based active material.

However, according to related art methods of forming a coating film, the coating film is formed only on the surface of the secondary particle of the Ni-based active material, and thus effects on improving lifespan characteristics are not satisfactory, or a deposition device is required, thereby increasing manufacturing costs and limiting mass production.

Therefore, the present inventors have carried out extensive research to solve the above problems and found a Ni-based active material precursor that is mass-produced with reduced manufacturing costs and enables uniform coating of phosphorus on the surfaces of and between a plurality of primary particles contained in the Ni-based active material, and a Ni-based active material obtained therefrom, thereby completing the present disclosure. The Ni-based active material is a product obtained from the above-described Ni-based active material precursor, and in some embodiments, prepared by mixing the Ni-based active material precursor and a lithium precursor and heat-treating the mixture. The Ni-based active material is coated with lithium phosphate instead of phosphorus when compared with the Ni-based active material precursor.

The Ni-based active material precursor according to the present disclosure has a porous structure in which primary particles are radially arranged for easy intercalation and deintercalation of lithium ions. The Ni-based active material precursor includes the porous core portion having pores and the shell portion having a radial arrangement structure. When an ionizable phosphorus compound is provided thereto, phosphorus is well coated in the porous core portion and between the plurality of primary particles, e.g., grain boundaries of the plurality of primary particles, of the shell portion of the Ni-based active material precursor. Also, phosphorus may be present on the secondary particle of the Ni-based active material in the form of a coating film. In this regard, the coating film may be a continuous or discontinuous coating film.

In preparation of the Ni-based active material precursor including phosphorus, a process of providing an ionizable phosphorus compound to a preliminary Ni-based active material precursor is performed. This process is performed by a wet process utilizing the preliminary Ni-based active material precursor and the ionizable phosphorus compound.

This process is a process of providing a mixture of the ionizable phosphorus compound and a solvent to the preliminary Ni-based active material precursor. The preliminary Ni-based active material precursor is impregnated into the mixture of the ionizable phosphorus compound and the solvent and then dried. Through this process utilizing the mixture of the ionizable phosphorus compound and the solvent, phosphorus (P) is adsorbed in the porous core portion, the shell portion, and the surface of the secondary particle of the precursor, thereby obtaining the Ni-based active material precursor containing phosphorus. In this case, phosphorus may refer to $PO_3^{2-}$, $PO_4^{3-}$, or any combination thereof.

The impregnation is performed at a temperature of 20° C. to 40° C. and drying is performed at a temperature of 150° C. to 200° C.

When a solid-phase reaction is utilized in the above-described process of providing the ionizable phosphorus compound to the preliminary Ni-based active material precursor, it is difficult to introduce lithium phosphate into the porous cores portion, unlike in the above-described wet process.

In the mixture of the ionizable phosphorus compound and the solvent, the concentration of the phosphorus compound is in a range of 0.02 M to 0.25 M. When the concentration of the ionizable phosphorus compound is within the above range, phosphorus is well adsorbed and coated on the surface of the Ni-based active material precursor and therein along the pores without impurities, thereby obtaining a Ni-based active material having suitable (e.g., excellent) lifespan characteristics.

The ionizable phosphorus-containing compound is, for example, $H_3PO_4$, $NH_3PO_4$, $NH_4HPO_4$, $NH_4H_2PO_4$ or any combination thereof. The content of the ionizable phosphorus-containing compound may be stoichiometrically adjusted to finally obtain the Ni-based active material precursor and the Ni-based active material. As used herein, the term "preliminary Ni-based active material precursor" refers to a resultant (e.g., a product) obtained by washing a product produced utilizing metal raw materials for forming a Ni-based active material precursor.

As a solvent, water, alcohol (such as ethanol, methanol, and/or isopropanol), or any combination thereof may be utilized.

In the preparation of the phosphorus-containing Ni-based active material precursor, in some embodiments, an ionizable phosphorus compound is utilized as a phosphorus source. When a phosphorus compound that is difficult to ionize, such as aluminum phosphate and/or tungsten phosphate, is utilized, it is difficult to obtain a Ni-based active material precursor having a desired structure.

The Ni-based active material precursor and the Ni-based active material obtained therefrom each have multi-center spherical shapes in which primary particles located at the outer periphery and constituting a secondary particle are radially arranged and core portions have pores. Thus, phosphorus (P) is coated on grain boundaries of the primary particles through multiple pores formed from the Ni-based active material precursor.

In the Ni-based active material precursor according to an embodiment, the content of phosphorus is controlled to hardly affect porosity of the Ni-based active material precursor (e.g., to not affect the porosity significantly). The content of phosphorus is about 0.01 wt % to about 2 wt %, about 0.01 wt % to about 1.5 wt %, about 0.01 wt % to about 1 wt %, about 0.01 wt % to about 0.5 wt %, about 0.01 wt % to about 0.3 wt %, about 0.01 wt % to about 0.2 wt %, or about 0.01 wt % to 0.1 wt % based on the total weight of the Ni-based active material precursor. In this regard, the term "the total weight of the Ni-based active material precursor" refers to a total weight of the Ni-based active material including phosphorus.

When the content of phosphorus is within the above ranges, a lithium secondary battery utilizing the Ni-based active material obtained from the Ni-based active material precursor may have improved lifespan characteristics, enhanced high-rate characteristics, and reduced gas generation. The content of phosphorus in the Ni-based active material precursor may be confirmed by inductively coupled plasma (ICP) analysis.

In the Ni-based active material precursor for a lithium secondary battery according to an embodiment, lithium phosphate may be present in the form of a coating film on the surface of the secondary particle. The thickness of the coating film may be 1 μm or less, for example, 500 nm or less, about 5 nm to about 300 nm, about 8 nm to about 200 nm, or, about 10 nm to about 50 nm. When the thickness of the coating film is within the ranges above, gas generation is efficiently reduced or inhibited after charging and discharging are repeated, lithium ion is easily diffused in the interface between a positive active material and an electrolyte, and a Ni-based active material easily diffused into the active material may be obtained.

Referring to FIG. 1A, a Ni-based active material precursor (having a particulate structure) 100 has a structure including a porous core portion 10 and a shell portion 20 in which primary particles 30 having plate shapes are radially arranged. When the ionizable phosphorus compound is provided to the Ni-based active material precursor, the ionizable phosphorus compound is easily provided at inner or outer portions thereof due to a number of paths for impregnation and/or adsorption of the ionizable phosphorus compound and the porous core portion 10. That is, due to the spaces formed among the radially arranged plate shaped primary particles 30 and the porous structure of the porous core portion 10, the ionizable phosphorus compound can suitably impregnate and/or adsorpt onto the inner porous core portion 10 and the outer shell portion 20 of Ni-based active material precursor. As such, phosphorus (P) 30a may be well coated (e.g., suitably coated) on the primary particles and the porous core portion in the Ni-based active material precursor because the paths for impregnation and/or adsorption of the ionizable phosphorus compound have a structure allowing easy (e.g., suitable) penetration into the porous core portion via pores of the shell portion. FIG. 1B shows that phosphorus 30a is present in the porous core portion, between the plurality of primary particles of the shell portion, e.g., grain boundaries, and on the surface of the secondary particle of the Ni-based active material precursor of FIG. 1A.

A Ni-based active material according to an embodiment is a product obtained from the Ni-based active material precursor of FIG. 1B and has the same structure as that of the Ni-based active material precursor of FIG. 1B, except that lithium phosphate (Li$_3$PO$_4$) is present instead of phosphorus. The lithium phosphate may have, for example, an amorphous phase.

A Ni-based active material for a lithium secondary battery according to an embodiment of the present disclosure includes a secondary particle including a plurality of particulate structures, wherein each of the particulate structures includes a porous core portion and a shell portion including primary particles radially arranged on the porous core portion, and lithium phosphate is present in the porous core portion, between the plurality of primary particles of the shell portion, and on the surface of the secondary particle.

The Ni-based active material includes a porous inner portion including the porous core portion; and an outer portion comprising the the shell portion. The Ni-based active material includes the porous inner portion having closed pores and the outer portion, wherein the porous inner portion has a density less than that of the outer portion, and the Ni-based active material has a net density of 4.7 g/cc or less. Here, the porous core portion is the porous inner portion, and the shell portion is the outer portion.

In the Ni-based active material precursor according to an embodiment, a ratio of phosphorus intensity in the inner portion to that in the outer portion is 1:2 to 1:4. In the Ni-based active material precursor, the ratio of phosphorus intensity in the porous core portion to that in the outer portion may be identified by time-of-flight secondary ion mass spectrometry (TOF-SIMS) analysis utilizing intensity differences of PO$_3$ peaks in each region.

In the Ni-based active material precursor according to another embodiment, a ratio of phosphorus intensity in the inner portion to that in the outer portion is, for example, in the range of 1:2.1 to 1:3.8, 1:2.3 to 1:3.7, 1:2.4 to 1:3.6, or 1:2.5 to 1:3.5. In this case, the inner portion includes the porous core portion and spaces between the plurality of primary particles of the shell portion, and the outer portion refers to the shell portion of the Ni-based active material precursor.

In the Ni-based active material according to an embodiment, the phosphorus (P) intensity of the inner portion (porous core portion and shell portion) to that of the outer portion (shell portion and surface of secondary particle) is in the range of 1:2 to 1:4, 1:2.1 to 1:3.8, 1:2.3 to 1:3.7, or 1:2.5 to 1;3.5, as the above-described Ni-based active material precursor.

Throughout the specification, the term "net density" refers to an intrinsic density of an electrode active material, and more particularly, refers to a density of only the portion completely filled with a substance except for gaps between particles. In the absence of closed pores, the net density is measured as a value equal to a solid density (theoretical density). However, in the case of a Ni-based active material having closed pores, the density decreases due to empty spaces formed therein. Thus, the net density of the Ni-based active material is a density of a solid having closed pores. Open pores, which are connected to surfaces and are not closed pores, are not reflected in the net density. A density calculated by dividing a weight by a volume may vary according to a method of measuring the volume and the net density is calculated by measuring a volume excluding the open pores (i.e., only counting the volume of the solid portion and the volume of the closed pores).

The net density is measured utilizing the Archimedes principle or by a gas pycnometer.

The Ni-based active material according to an embodiment has a net density of 4.50 g/cc to 4.7 g/cc, for example, 4.5165 g/cc to 4.6657 g/cc.

Throughout the specification, the terms "inner portion" and "outer portion" of the active material are defined as follows.

According to an embodiment, the terms "inner portion" and "outer portion" refer to an inner region and an outer region when the active material is divided (e.g., partitioned) at the same rate (e.g., at the same ratio) in all directions from the center to the surface of the active material, respectively. For example, the inner portion refers to a region corresponding to 10% to 90% by volume, for example, 50% by volume from the center, based on a total volume of the active material, and the outer portion refers to the remaining region.

According to another embodiment, the term "outer portion" refers to a region corresponding to 30% to 50% by volume, for example, 40% by volume, from the outermost surface based on a total volume of the Ni-based active material (i.e., from the center to the outermost surface thereof) or a region within 2 μm from the outermost periphery (i.e., based on a total distance from the center to the surface) of the Ni-based active material. The term "inner portion" refers to a region corresponding to 50% to 70% by volume, for example, 60% by volume, from the center based on the total volume of the Ni-based active material or the remaining region except for the region within 2 μm from the outermost periphery (i.e., based on the total distance from the center to the surface) of the Ni-based active material.

In the inner portion of the Ni-based active material according to an embodiment, pore sizes of the closed pores are in the range of 150 nm to 1 μm and a porosity is in the range of 3% to 30%. The porosity of the inner portion is greater than that of the outer portion by about 1.2 times or more, for example, 2 times or more.

The pore size and porosity of the inner portion are greater and more irregular than those of the outer portion.

For example, the outer portion of the Ni-based active material has a porosity of 0.1 to 2.5%. The porosities of the inner portion and the outer portion utilized herein refer to porosities of closed pores included in the inner portion and the outer portion.

When the porosities of the inner portion and the outer portion of the Ni-based active material satisfy the aforementioned ranges, the outer portion becomes more densified than the inner portion, so that side reactions with an electrolytic solution at a high temperature may be efficiently suppressed.

The pore sizes of the inner portion may be in the range of 150 nm to 1 μm, for example, 200 nm to 500 nm, and the pore sizes of the outer portion may be less than 150 nm, for example, 100 nm or less, or in the range of 20 nm to 90 nm. Because the pore sizes of the inner portion are greater than those of the outer portion as described above, a lithium ion diffusion distance is shortened compared to secondary particles of the same size, and the pores buffer a volume change occurring during charging and discharging without being exposed to the electrolytic solution.

As used herein, the term "pore size" refers to an average pore diameter or an opening width in the case of spherical or circular pores. The pore size refers to an average major axis length in the case of non-spherical or non-circular pores such as elliptical pores.

The Ni-based active material includes plate particles whose major axes are radially arranged. In this case, a surface through which lithium ions may enter and exit (e.g., surface perpendicular to the (001) crystal plane) is exposed on the surface of the secondary particle. The outer portion of the Ni-based active material has exposed pores (e.g., open pores) directed toward the inner portion from the surface and the inner portion has an irregular porous structure. The pores exposed on the surface are exposed pores through which the electrolytic solution passes. An "irregular porous structure" refers to a structure having pores having non-uniform and irregular pore sizes and pore shapes. The inner portion having the irregular porous structure includes plate particles in the same manner as in the outer portion. The plate particles are arranged irregularly in the inner portion, unlike in the outer portion.

As used herein, the term "radially" indicates that a particle is arranged such that the thickness direction (e.g., the (001) direction) of the plate particle is normal or perpendicular (or substantially perpendicular) to a direction R toward the center of the secondary particle.

An average thickness of the plate particles constituting the outer portion and the inner portion is in the range of 100 nm to 200 nm, for example, 120 nm to 180 nm, or 130 nm to 150 nm, and an average length thereof is in the range of 150 nm to 500 nm, for example, 200 nm to 380 nm, or 290 nm to 360 nm. The average length refers to a mean value of an average length of the major axis of the plate particle and an average length of the minor axis of the plate particle in the plane direction.

A ratio of the average thickness to the average length is from 1:2 to 1:10, for example, 1:2.1 to 1:5, or 1:2.3 to 1:2.9. When the ratio of the average thickness to the average length of the plate particles is within the aforementioned ranges, the sizes of the plate particles are small, and the primary particles are radially arranged in the outer portion. A number of paths for diffusion of lithium ions are formed in a relatively large number of grain boundaries between particles in regions close to the surface, and a large number of crystal surfaces enabling lithium ion transfer in the outer portion are exposed. Thus, the degree of diffusion of lithium ions increases, thereby increasing initial efficiency and capacity. In addition, when the plate-like primary particles are radially arranged, pores exposed on the surface also face the center, thereby facilitating diffusion of lithium ions from the surface. Because the radially arranged primary particles uniformly shrink and expand during intercalation and deintercalation of lithium ions, pores arranged in the 001 direction, which is a direction where particles expand during deintercalation of lithium ions, serve as a buffer, and because the plate-like primary particles are small in size, the possibility of occurrence of cracks decreases during shrinkage and expansion. In addition, because the pores of the inner portion further decreases (e.g., suppresses) a volume change, the possibility of occurrence of cracks in the primary particles during charging and discharging decreases, thereby improving lifespan characteristics and reducing the resistance.

Closed pores and/or open pores may be present in the outer portion of the Ni-based active material. While it is difficult for an electrolyte, and/or the like, to be contained in the inner portion of the Ni-based active material due to the closed pores, the outer portion may contain the electrolyte, and/or the like, in the case where the outer portion of the Ni-based active material has open pores.

A Ni-based active material precursor for a lithium secondary battery according to an embodiment includes a secondary particle including a plurality of particulate structures, wherein each of the particulate structures includes a porous core portion and a shell portion including primary particles radially arranged on the porous core portion, and in 50% or more of the primary particles constituting the surface of the secondary particle, major axes of the primary particles are arranged in the normal direction of the surface of the secondary particle.

Figure 2A:
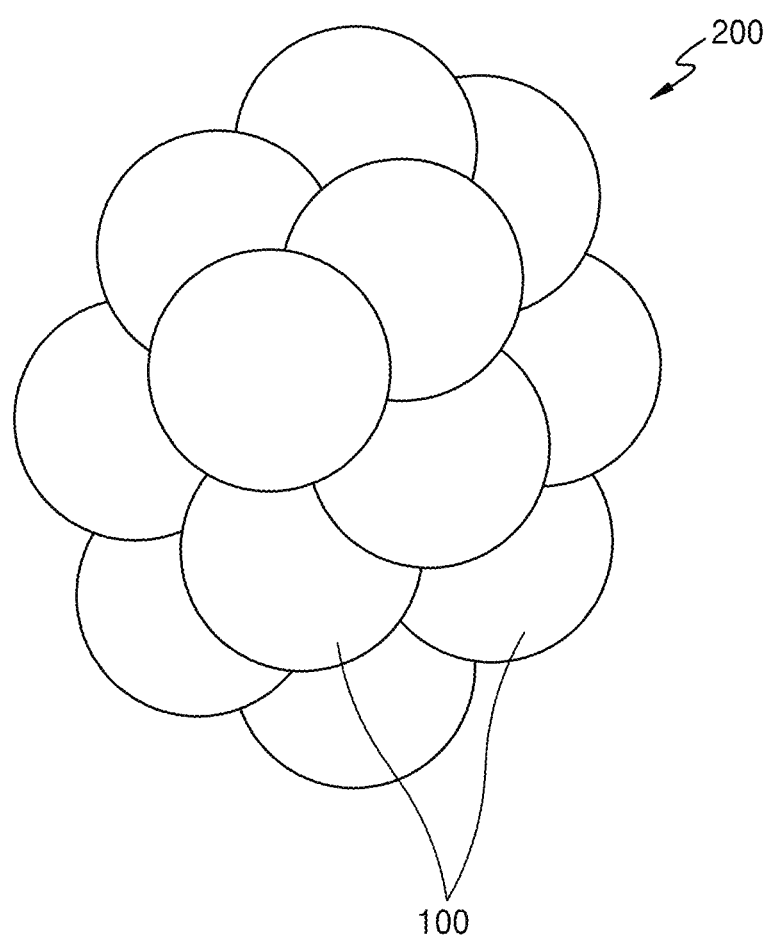
FIG. 2A is a schematic diagram showing a secondary particle included in a Ni-based active material precursor according to an embodiment.

Referring to FIG. 2A, a Ni-based active material precursor for a lithium secondary battery includes a secondary particle 200 including a plurality of particulate structures 100.

Figure 2B:
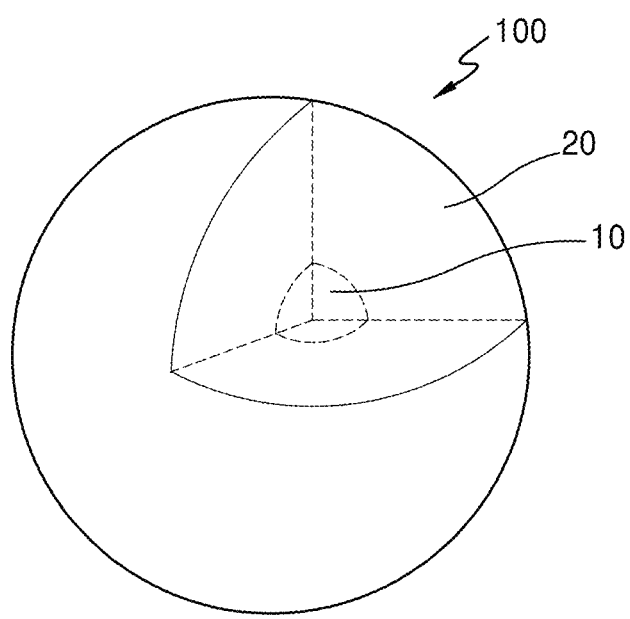
FIG. 2B is a schematic partial see-through perspective view of a particulate structure included in the secondary particle of FIG. 2A.
Figure 2C:
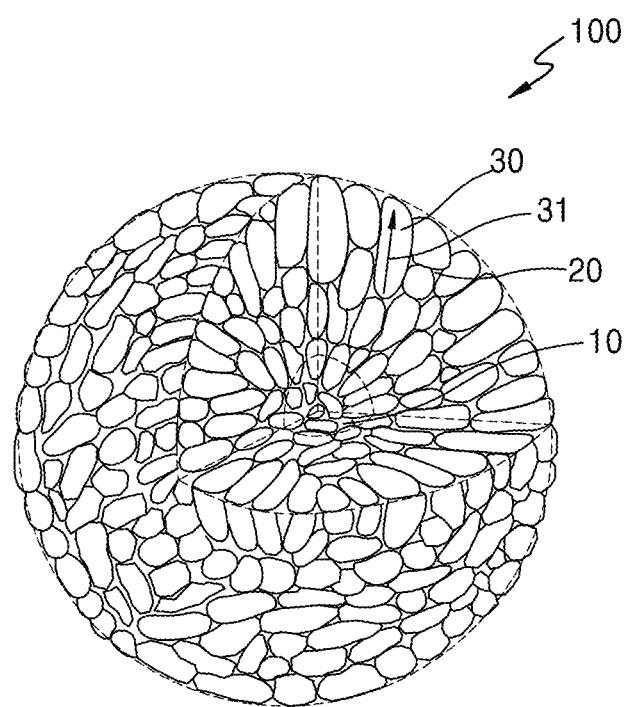
FIG. 2C is a more detailed partial see-through perspective view of the particulate structure included in the secondary particle of FIG. 2A.
Figure 2D:
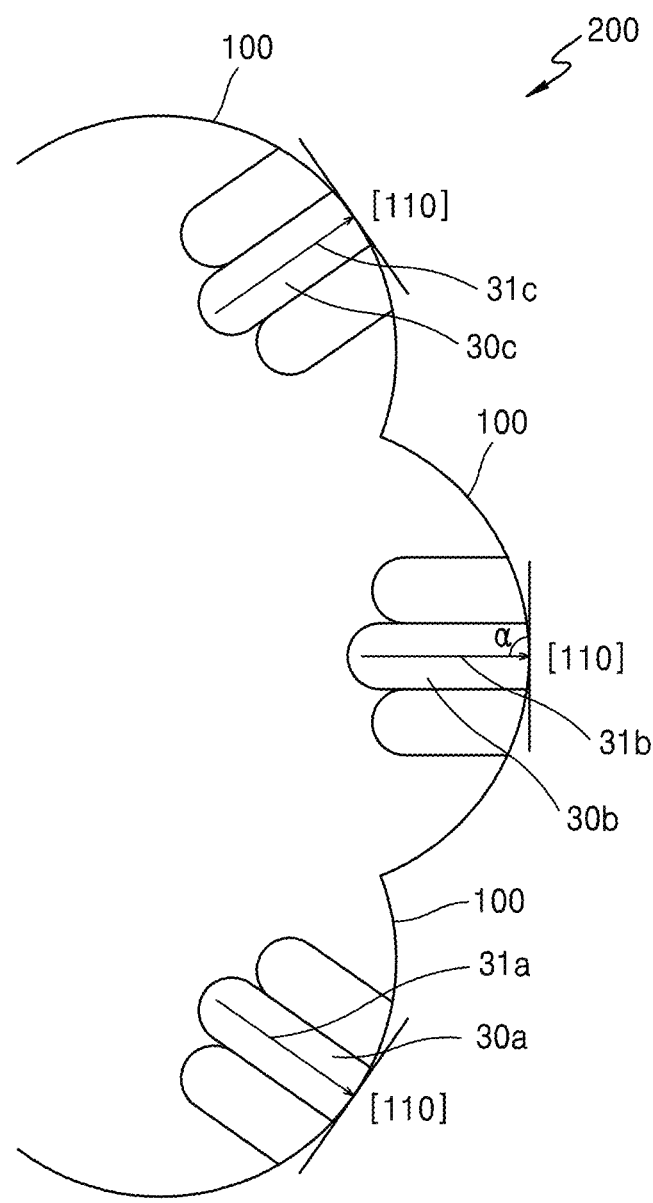
FIG. 2D is a schematic cross-sectional view of the surface of a secondary particle included in a Ni-based active material precursor according to an embodiment.

Referring to FIG. 2B, the particulate structure 100 includes a porous core portion 10 and a shell portion 20 including primary particles 30 radially arranged on the porous core portion 10. Referring to FIGS. 2C-2D, in 50% or more of the primary particles 30a, 30b, and 30c constituting the surface of the secondary particle 200 including the plurality of particulate structures 100, the major axes 31, 31a, 31b, and 31c of the primary particles are aligned in the normal direction of the surface of the secondary particle 200. For example, in 50% or more of the primary particles 30a, 30b, and 30c constituting the surface of the secondary particle 200 including the plurality of particulate structures 100, the major axes 31, 31a, 31b, and 31c of the primary particles are disposed at an angle (α) of 90° with the surface of the secondary particle 200.

Referring to FIGS. 2B, 2C, and 2D, because the secondary particle 200 is an assembly of the plurality of particulate structures 100, the diffusion distance of lithium ions during charging and discharging is reduced as compared with a related art secondary particle including one particulate structure. The core portion 10 of the particulate structure 100 is porous, and the primary particles 30 are radially arranged on the core portion 10 to form the shell portion, thereby effectively buffering the volume change of the primary particles 30 during charging and discharging. Therefore, the cracking of the secondary particles 200 due to the volume change of the secondary particle 200 during charging and discharging is prevented or reduced. The (110) plane of the primary particle 30 is a crystal plane where lithium ions are injected into and discharged from the nickel-based active material obtained from the nickel-based active material precursor having a layered crystal structure. When the major axes 31, 31a, 31b, and 31c of the primary particles constituting the surface of the secondary particle 200 are aligned in the normal direction of the surface of the secondary particle 200, the diffusion of lithium ions on the interface between the electrolyte and the nickel-based active material obtained from the nickel-based active material precursor is easy (e.g., suitable), and the diffusion of lithium ions into the nickel-based active material obtained from the nickel-based active material precursor is also easy (e.g., suitable). Therefore, the usage of lithium ions in the nickel-based active material obtained from the nickel-based active material precursor including such a secondary particle 200 further increases.

Referring to FIGS. 2B and 2C, the "shell portion 20" refers to a region of 30 length % to 50 length %, for example, 40 length % from the outermost of the particulate structure 100 in the total distance from the center of the particulate structure 100 to the surface thereof, or refers to a region within 2 μm from the surface of the particulate structure 100. The "core portion 10" refers to a region of 50 length % to 70 length %, for example, 60 length % from the center of the particulate structure 100 in the total distance from the center of the particulate structure 100 to the outermost thereof, or refers to a region excluding the region within 2 μm from the surface of the particulate structure 100. The center of the particulate structure 100 is, for example, a geometrical center of the particulate structure 100. Although the particulate structure 100 having a complete particle shape (e.g., a spherical shape) is shown in FIGS. 2B and 2C, the particular structures 100 may have partial particle shapes (e.g., not in a perfect spherical shape) because the particulate structures 100 partially overlap one another in the secondary particle 200 of FIG. 2 obtained by assembling the plurality of particulate structures 100.

Referring to FIGS. 2B, 2C and 2D, in an example of the secondary particle 200, the content of the primary particles 30, 30a, 30b, and 30c whose major axes 31a, 31b, and 31c are aligned in the normal direction of the surface of the secondary particle 200 is about 50% to about 95%, about 50% to about 90%, about 55% to about 85%, about 60% to about 80%, about 65% to about 80%, or about 70% to about 80% with respect to the total content (e.g., total number) of the primary particles 30, 30a, 30b, and 30c constituting the surface of the secondary particle 200. In the nickel-based active material precursor (or the nickel-based active material) including the secondary particle 200 having the above content range of the primary particles 30, the usage of lithium ions is easier. Further, referring to FIGS. 2B, 2C, and 2D, in an example of the secondary particle 200, the content of the primary particles 30, 30a, 30b, and 30c whose major axes 31a, 31b, and 31c are aligned in the normal direction of the surface of the secondary particle 200 is about 50% to about 95%, about 50% to about 90%, about 55% to about 85%, about 60% to about 80%, about 65% to about 80%, or about 70% to about 80% with respect to the total content (e.g., total number) of the primary particles 30, 30a, 30b, and 30c constituting the shell portion 20 of the secondary particle 200.

Referring to FIGS. 2B, 2C and 2D, one exemplary primary particle 30, 30a, 30b, or 30c is a non-spherical particle having a minor axis and a major axis. The minor axis is an axis connecting the points at which the distance between both ends of the primary particle 30, 30a, 30b, or 30c is the smallest, and the major axis is an axis connecting the points at which the distance between both ends of the primary particle 30, 30a, 30b, or 30c is the largest. The ratio of minor axis to major axis of the primary particle 30, 30a, 30b, or 30c is, for example, 1:2 to 1:20, 1:3 to 1:20, or 1:5 to 1:15. When the ratio of minor axis to major axis of the primary particle 30, 30a, 30b, or 30c is within the above ranges, the usage of lithium ions in the nickel-based active material obtained from the nickel-based active material precursor is easier.

Referring to FIGS. 2B, 2C and 2D, the primary particle 30, 30a, 30b, or 30c includes a plate particle as a non-spherical particle. The plate particle is a particle having two surfaces at opposite sides. A length of the surface of the plate particle is greater than a thickness of the plate particle, which is a distance between the two opposite surfaces. The length of the surface of the plate particle is a larger one of two lengths defining the surface. The two lengths defining the surface of the plate particle are the same as or different from each other and are greater than the thickness of the plate particle. The thickness of the plate particle is a length of the minor axis, and the length of the surface of the plate particle is a length of the major axis. The shape of the surface of the plate particle may be a polyhedron such as a trihedron, a tetrahedron, a pentahedron, or a hexahedron, a circle, or an ellipse, but the present disclosure is not limited thereto. Any suitable shape may be utilized as long as it may be utilized in the shape of the plate particle in the related art. The plate particles are, for example, nanodisks, rectangular nanosheets, pentagonal nanosheets, or hexagonal nanosheets. The detailed (specific) shape of the plate particles depends on the detailed (specific) conditions under which the secondary particles are produced. The two surfaces of the plate particle may not be parallel to each other, the angle between the surface and side surface of the plate particle may be variously changed, the edges of the surface and side surface of the plate particle may be rounded, and each of the surface and side surface of the plate particle may be planar or curved. The ratio of thickness to surface length of the plate particle is, for example, 1:2 to 1:20, 1:3 to 1:20, or 1:5 to 1:15. The average thickness of one exemplary plate particle is about 100 nm to about 250 nm or about 100 nm to about 200 nm, and the average surface length thereof is about 250 nm to about 1100 nm or about 300 nm to about 100 nm. The average surface length of the plate particles is 2 to 10 times the average thickness thereof. When the plate particle has the thickness, average surface length, and the ratio thereof within the above ranges, it is easier for the plate particles to be arranged radially on the porous core portion, and as a result, the usage of lithium ions is easier. Further, in the secondary particle 200, the major axes corresponding to the surface length direction of the plate particles, that is, the major axes 31a, 31b, and 31c of the primary particles are aligned in the normal direction of the surface of the secondary particle 200. When the major axes of the plate particles are arranged in this direction, the crystal plane, where the lithium ion diffusion path is directed toward on the surface of the secondary particle 200 and the injection and discharge of lithium ions is performed on the surface of the secondary particle 200, that is, the (110) plane of the plate particle is greatly (e.g., suitably) exposed, and thus lithium ions in the nickel-based active material precursor (or the nickel-based active material) including plate particles as the primary particles 30 are more easily utilized (e.g., intercalated and deintercalated).

Further, referring to FIGS. 2B, 2C and 2D, in 50% or more of the primary particles 30, 30a, 30b, and 30c constituting the surface of the secondary particle 200, major axis of each of the primary particles 30, 30a, 30b, and 30c are arranged in a normal direction of the (110) plane of the primary particles 30, 30a, 30b, and 30c constituting the surface of the secondary particle 200. For example, in 60% to 80% of the primary particles 30, 30a, 30b, and 30c constituting the surface of the secondary particle 200, major axis of each of the primary particles 30, 30a, 30b, and 30c are disposed in a normal direction of the (110) plane of the primary particles 30, 30a, 30b, and 30c constituting the surface of the secondary particle 200.

Referring to FIGS. 2A and 2C, the secondary particle 200 has multiple centers, and includes the plurality of particulate structures 100 arranged in an isotropic array. The secondary particle 200 includes the plurality of particulate structures 100, and each of the particulate structures 100 includes a porous core portion 10 corresponding to the center, so that the secondary particle 200 has a plurality of centers. Therefore, in the nickel-based active material obtained from the nickel-based precursor, the travel path of lithium ions from the plurality of centers in the secondary particle 200 to the surface of the secondary particle 200 is reduced. As a result, the usage of lithium ions in the nickel-based active material obtained from the nickel-based precursor is easier. Further, in the nickel-based active material obtained from the nickel-based precursor, the plurality of particulate structures 100 included in the secondary particle 200 have an isotropic arrangement in which the particles (e.g., particulate structures 100) are arranged without a certain directionality, and thus it is possible to uniformly utilize lithium ions irrespective of the specific directions in which the secondary particles 200 are arranged. The secondary particle 200 is, for example, a spherical particle or a non-spherical particle depending on an assembled shape of the plurality of particulate structures 100.

Referring to FIGS. 2A to 2D, in the nickel-based active material precursor, the size of the particulate structure 100 is, for example, about 2 μm to about 7 μm, about 3 μm to about 6 μm, about 3 μm to about 5 μm, or about 3 μm to about 4 μm. When the particulate structure 100 has a size within the above ranges, the plurality of particulate structures 100 are easily assembled to form an isotropic arrangement, and the usage of lithium ions in the nickel-based active material obtained from the nickel-based active material precursor is easier.

As used herein, the term "particle size" refers to an average particle diameter in the case of spherical particles, and refers to an average major axis length in the case of non-spherical particles. The particle size may be measured utilizing a particle size analyzer (PSA).

Referring to FIG. 2A, in the nickel-based active material precursor, the size of the secondary particle 200 is, for example, about 5 μm to about 25 μm or about 8 μm to about 20 μm. When the secondary particle 200 has a size within the above ranges, the usage of lithium ions in the nickel-based active material obtained from the nickel-based active material precursor is easier.

Referring to FIGS. 2B and 2C, the pore size of the porous core portion 10 included in the particulate structure 100 is about 150 nm to about 1 μm, about 150 nm to about 550 nm, or about 200 nm to about 800 nm. Further, the pore size of the shell portion 20 included in the particulate structure 100 is less than 150 nm, 100 nm or less, or about 20 nm to about 90 nm. The porosity of the porous core portion 10 included in the particulate structure 100 is about 5% to about 15% or about 5% to about 10%. Further, the porosity of the shell portion 20 included in the particulate structure 100 is about 1% to about 5% or about 1% to about 3%. When the particulate structure 100 has a pore size and porosity within the above ranges, the capacity characteristics of the nickel-based active material obtained from the nickel-based active material precursor are desirable (e.g., excellent). In an example of the particulate structure 100, the porosity of the shell portion 20 is controlled to be lower than the porosity of the porous core portion 10. For example, the pore size and porosity of the porous core portion 10 are larger than the pore size and porosity of the shell portion 20 and are controlled to be more irregular (e.g., in size, shape, and/or distribution of the pores) as compared to the pore size and porosity of the shell portion 20. When the porosity of the porous core portion 10 and the porosity of the shell portion 20 in the particulate structure 100 satisfy the above ranges and relationships, the density of the shell portion 20 is increased as compared with the density of the porous core portion 10, and thus the side reaction of the particulate structure 100 with the electrolyte is effectively suppressed.

In an example of the particulate structure 100, the porous core portion 10 may have closed pores, and the shell portion 20 may have closed pores and/or open pores. The closed pores are difficult to contain an electrolyte, whereas the open pores may allow the electrolyte to be contained in the pores of the particulate structure 100. Further, the porous core portion of the particulate structure 100 may have irregular pores. The core portion 10, having irregular pores, may include plate particles, like (e.g., similar to) the shell portion 20, and the plate particles of the core portion 10, unlike the plate particles of the shell portion 20, may be arranged without regularity.

As used herein, the term "irregular pores" refer to pores which are not regular in pore size and pore shape and do not have uniformity. The core portion including irregular pores, unlike the shell portion, may include amorphous particles, and the amorphous particles are arranged without regularity, unlike the shell portion.

The Ni-based active material precursor may be a compound represented by Formula 1 below.

$$Ni_{1-x-y-z}Co_xMn_yM_z(OH)_2 \qquad \text{Formula 1}$$

In Formula 1, M is an element selected from boron (B), magnesium (Mg), calcium (Ca), strontium (Sr), barium (Ba), titanium (Ti), vanadium (V), chromium (Cr), iron (Fe), copper (Cu), and zirconium (Zr), and $0.3 \leq (1-x-y-z) < 1$, $0 < x < 1$, $0 \leq y < 1$, and $0 \leq z < 1$.

In some embodiments, in Formula 1, $x < (1-x-y-z)$, $y < (1-x-y-z)$. That is, in the nickel-based active material precursor of Formula 1, the content of nickel is higher than the content of cobalt, and the content of nickel is higher than the content of manganese. In some embodiments, in Formula 1, $0 < x \leq 1/3$, $0 \leq y \leq 0.5$, $0 \leq z \leq 0.05$, and $1/23 \leq (1-x-y-z) \leq 0.98$.

According to an embodiment, in Formula 1, x may be about 0.1 to about 0.3, y may be about 0.05 to about 0.3, and z may be 0.

In Formula 1, the content of Ni of the Ni-based active material precursor may be about 30 mol % to about 98 mol %, about 70 mol % to about 96 mol %, or about 85 mol % to 95 mol %.

The Ni-based active material precursor may be, for example, $Ni_{0.92}Co_{0.05}Al_{0.03}(OH)_2$, $Ni_{0.94}Co_{0.03}Al_{0.03}(OH)_2$, $Ni_{0.88}Co_{0.06}Al_{0.06}(OH)_2$, $Ni_{0.96}Co_{0.02}Al_{0.02}(OH)_2$, $Ni_{0.93}Co_{0.04}Al_{0.03}(OH)_2$, $Ni_{0.8}Co_{0.15}Al_{0.05}O_2(OH)_2$, $Ni_{0.75}Co_{0.20}Al_{0.05}(OH)_2$, $Ni_{0.92}Co_{0.05}Mn_{0.03}(OH)_2$, $Ni_{0.94}Co_{0.03}Mn_{0.03}(OH)_2$, $Ni_{0.88}Co_{0.06}Mn_{0.06}(OH)_2$, $Ni_{0.96}Co_{0.02}Mn_{0.02}(OH)_2$, $Ni_{0.93}Co_{0.04}Mn_{0.03}(OH)_2$, $Ni_{0.8}Co_{0.15}Mn_{0.05}O_2(OH)_2$, $Ni_{0.75}Co_{0.20}Mn_{0.05}(OH)_2$, $Ni_{0.6}Co_{0.2}Mn_{0.2}(OH)_2$, $Ni_{0.7}Co_{0.15}Mn_{0.15}(OH)_2$, $Ni_{0.7}Co_{0.1}Mn_{0.2}(OH)_2$, $Ni_{0.5}Co_{0.2}Mn_{0.3}(OH)_2$, $Ni_{1/3}Co_{1/3}Mn_{1/3}(OH)_2$, $Ni_{0.8}Co_{0.1}Mn_{0.1}(OH)_2$, $Ni_{0.85}Co_{0.1}Al_{0.05}(OH)_2$, $Ni_{0.7}Co_{0.15}Mn_{0.15}(OH)_2$, $Ni_{0.7}Co_{0.1}Mn_{0.2}(OH)_2$, $Ni_{0.5}Co_{0.2}Mn_{0.3}(OH)_2$, $Ni_{1/3}Co_{1/3}Mn_{1/3}(OH)_2$, $Ni_{0.5}Co_{0.1}Mn_{0.1}(OH)_2$, and/or $Ni_{0.85}Co_{0.1}Al_{0.05}(OH)_2$.

A method of preparing a Ni-based active material precursor according to another embodiment includes: supplying a feedstock at a first feed rate and stirring the feedstock to form a precursor seed in a first act; supplying the feedstock to the precursor seed formed in the first act at a second feed rate and stirring the feedstock to grow the precursor seed in a second act; and supplying the feedstock to the precursor seed grown in the second act at a third feed rate and stirring the feedstock to adjust the growth of the precursor seed in a third act, wherein the feedstock includes a complexing agent, a pH adjusting agent, and a metal raw material for forming the nickel-based active material precursor, and the second feed rate of the metal raw material for forming the nickel-based active material precursor is greater than the first feed rate, and the third feed rate is greater than the second feed rate.

A nickel-based active material precursor having the aforementioned new (e.g., novel) structure may be obtained by sequentially increasing the feed rate of the metal raw material in the order of the first act, the second act, and the third act. In the first act, the second act, and the third act, the reaction temperature is in a range of about 40° C. to about 60° C., the stirring power is in a range of about 0.5 kW/m³ to about 6.0 kW/m³, the pH is in a range of about 10 to about 12, and the content of the complexing agent in the reaction mixture is in a range of about 0.2 M to about 0.8 M, for example, about 0.4 M to about 0.6 M. In the above ranges, a nickel-based active material precursor that more closely matches the aforementioned structure may be obtained.

In the first act, the precursor seed is formed and grown by adjusting the pH while supplying the metal raw material and the complexing agent to a reactor including an aqueous solution containing the complexing agent and the pH adjusting agent and having an adjusted pH at a set or predetermined feed rate. In the first act, the growth rate of precursor particles may be about 0.32 μm/hr±about 0.05 μm/hr. In the first act, the stirring power of the reaction mixture may be about 4 kW/m³ to about 6 kW/m³, for example 5.0 kW/m³, and the pH may be about 11 to about 12. For example, in the first act, the feed rate of the metal raw material is about 1.0 L/hr to about 10.0 L/hr, for example, 5.1 L/hr, and the feed rate of the complexing agent is about 0.3 times to about 0.6 times, for example, 0.45 times the molar feed rate of the metal raw material. The temperature of the reaction mixture is about 40° C. to about 60° C., for example, 50° C., and the pH of the reaction mixture is about 11.20 to about 11.70, for example about 11.3 to about 11.5.

In the second act, the precursor seed formed in the first act is grown by changing the reaction conditions. The growth rate of the precursor seed in the second act is equal to the growth rate of the precursor seed in the first act or is increased by 20% or more. The feed rate of the metal raw material in the second act is 1.1 times or more, for example, about 1.1 times to about 1.5 times as compared with the feed rate of the metal raw material in the first act, and the concentration of the complexing agent in the reaction mixture may be increased by 0.05 M or more, for example, about 0.05 M to about 0.15 M based on the concentration of the complexing agent in the first act. In the second act, the stirring power of the reaction mixture may be equal to or more than 1 kW/m² and less than 4 kW/m², for example, 3 kW/m², and the pH thereof may be about 10.5 to about 11. An average particle diameter D50 of the precursor particles obtained in the second act may be about 9 μm to about 12 μm, for example, about 10 μm.

In the third act, the growth rate of the precursor seed is adjusted to obtain a nickel-based active material precursor for a lithium secondary battery. When the average particle diameter D50 of the precursor particles in the second act reaches about 9 μm to about 12 μm, for example, about 10 μm, the third act proceeds. The growth rate of the precursor particles in the third act may be increased by twice or more, for example, three times or more, as compared with the growth rate of the precursor particles in the second act. For this purpose, a part of the reaction product contained in the reactor after the second act may be removed to dilute the concentration of the reaction product in the reactor. The product removed from the reactor may be utilized in another reactor. The feed rate of the metal raw material in the third act may be 1.1 times or more, for example, about 1.1 times to about 1.5 times as compared with the feed rate of the metal raw material in the second act, and the concentration of the complexing agent in the reaction mixture may be increased by 0.05 M or more, for example, about 0.05 M to about 0.15 M based on the concentration of the complexing agent in the second act. In the third act, a precipitate rapidly grows to obtain a nickel-based active material precursor. The stirring power of the reaction mixture in the third act may be 0.5 kW/m² or more and less than 1 kW/m², for example, 0.8 kW/m², and the pH thereof may be about 10 to about 10.5.

In the method of preparing the precursor, the feed rate of the metal raw material may be sequentially increased in the order of the first act, the second act, and the third act. For example, the feed rate of the metal raw material in the second act may be increased by about 10% to about 50% based on the feed rate of the metal raw material in the first act, and the feed rate of the metal raw material in the third act may be increased by about 10% to about 50% based on the feed rate of the metal raw material in the second act. As such, the feed rate of the metal raw material may be gradually increased, thereby obtaining a nickel-based active material precursor that more closely matches the aforementioned structure.

In the method of preparing the precursor, the stirring speed of the reaction mixture in the reactor may be sequentially decreased in the order of the first act, the second act, and the third act. As such, the stirring speed of the reaction mixture may be gradually decreased, thereby obtaining a nickel-based active material precursor that more closely matches the aforementioned structure.

In the method of preparing the precursor, the stirring power (e.g., stirring speed) of the reaction mixture in the reactor may be sequentially decreased in the order of the first act, the second act, and the third act. The stirring power in the first act may be about 4 kW/m$^2$ to about 6 kW/m$^2$, the stirring power in the second act may be 1 kW/m$^2$ or more and less than 4 kW/m$^2$, and the stirring power in the third act may be 0.5 kW/m$^2$ or more and less than 1 kW/m$^2$. As such, the stirring power of the reaction mixture may be gradually decreased, thereby obtaining a nickel-based active material precursor that more closely matches the aforementioned structure.

In the method of preparing the precursor, the pH of the reaction mixture in the reactor may be sequentially decreased in the order of the first act, the second act, and the third act. For example, the pH of the reaction mixture in the first act, the second act, and the third act may be in a range of about 10.10 to about 11.50 when the reaction temperature is 50° C. For example, the pH of the reaction mixture in the third act may be lower than the pH of the reaction mixture in the first act at a reaction temperature of 50° C. by about 1.1 to about 1.6, or about 1.2 to about 1.5. For example, the pH of the reaction mixture in the second act may be lower than the pH of the reaction mixture in the first act by about 0.55 to about 0.85 at a reaction temperature of 50° C., and the pH of the reaction mixture in the third act may be lower than the pH of the reaction mixture in second act by about 0.35 to about 0.55 at a reaction temperature of 50° C. As such, the pH of the reaction mixture may be gradually decreased, thereby obtaining a nickel-based active material precursor that more closely matches the aforementioned structure.

In the method of preparing the precursor, the concentration of the complexing agent included in the reaction mixture in the second act may be increased as compared with the concentration of the complexing agent included in the reaction mixture in the first act, and the concentration of the complexing agent included in the reaction mixture in the third act may be increased as compared with the concentration of the complexing agent included in the reaction temperature in the second act.

The feed rate of the metal raw material for growing the nickel-based active material precursor particles to control the growth rate of the precursor particles in the second act may be increased by about 15% to about 35%, for example, about 25%, as compared with the feed rate thereof in the first act, and the feed rate thereof in the third act may be increased by about 20% to about 35%, for example, about 33%, as compared with the feed rate thereof in the second act. Further, the feed rate of aqueous ammonia in the second act may be increased by about 10% to about 30%, for example, about 20%, based on the feed rate of aqueous ammonia in the first act to increase the density of particles.

Considering the composition of the nickel-based active material precursor, a metal precursor may be utilized as the metal raw material. Examples of the metal raw material may include, but are limited to, metal carbonate, metal sulfate, metal nitrate, and metal chloride. Any metal precursor may be utilized as long as it may be utilized in the related art.

The pH adjusting agent acts to lower the solubility of metal ions in the reactor to precipitate metal ions into hydroxides. Examples of the pH adjusting agent may include sodium hydroxide (NaOH), and sodium carbonate (Na$_2$CO$_3$). The pH adjusting agent may be, for example, sodium hydroxide (NaOH).

The complexing agent acts to control the reaction rate in formation of a precipitate in a coprecipitation reaction. Examples of the complexing agent may include ammonium hydroxide (NH$_4$OH) (aqueous ammonia), citric acid, acrylic acid, tartaric acid, and glycolic acid. The content of the complexing agent is utilized at a general (e.g., suitable) level. The complexing agent is, for example, aqueous ammonia.

To obtain the Ni-based active material precursor according to an embodiment, the product obtained according to the above-described three acts was washed and an ionizable phosphorus-containing compound is added to the washed product. During washing, water, and/or the like may be utilized. In some embodiments, during washing, an alcohol solvent such as ethanol, isopropanol, and/or propanol may further be utilized.

The adding of the ionizable phosphorus-containing compound to the washed product is an act of impregnating the washed product in a mixture of an ionizable water-soluble phosphorus-containing compound and a solvent. The solvent may be water, an alcohol solvent, or any combination thereof.

Then, the resultant is dried to obtain a desired Ni-based active material precursor.

The Ni-based active material precursor prepared according to the above-described preparation method was subjected to TOF-SIMS, thereby identifying the shape, structure, and composition of the Ni-based active material precursor. An Ni-based active material according to another embodiment is obtained from the above-described Ni-based active material precursor. The Ni-based active material may be a compound represented by Formula 2 below.

$$Li_a(Ni_{1-x-y-z}Co_xAl_yM_z)O_{2\pm\alpha 1}$$ Formula 2

In Formula 2, M is an element selected from boron (B), magnesium (Mg), calcium (Ca), strontium (Sr), barium (Ba), titanium (Ti), vanadium (V), chromium (Cr), iron (Fe), copper (Cu), and zirconium (Zr), and $0.95 \le a \le 1.1$, $0.3 \le (1-x-y-z) < 1$, $0 < x < 1$, $0 \le y < 1$, $0 \le z < 1$, and $0 \le \alpha 1 \le 0.1$.

In some embodiments, in Formula 2, $x<(1-x-y-z)$, $y<(1-x-y-z)$. That is, In the compound represented by Formula 2, the content of nickel is higher than the content of cobalt, and the content of nickel is higher than the content of manganese. In some embodiments, in Formula 2, $1.0 \le a \le 1.3$ and $0<x \le \frac{1}{3}$ may be satisfied, and $0 \le z \le 0.5$, $0 \le z \le 0.05$, and $\frac{1}{3} \le (1-x-y-z) \le 0.98$ may be satisfied.

In Formula 2, a may be from 1 to 1.1, x may be from 0.1 to 0.3, y may be from 0.05 to 0.3, and z may be 0.

In the Ni-based active material, the content of nickel may be about 33 mol % to about 98 mol %, for example, about 70 mol % to about 96 mol %, for example, about 85 mol % to about 95 mol % based on the total content of the transition metals. The total content of the transition metals refers to a sum of the contents of nickel, cobalt, manganese, and M in Formula 2.

The Ni-based active material may be, for example, LiNi$_{0.6}$Co$_{0.2}$Mn$_{0.2}$O$_2$, LiNi$_{0.7}$Co$_{0.15}$Mn$_{0.15}$O$_2$, LiNi$_{0.7}$Co$_{0.1}$Mn$_{0.2}$O$_2$, LiNi$_{0.5}$Co$_{0.2}$Mn$_{0.3}$O$_2$, LiNi$_{1/3}$Co$_{1/3}$ $Mn_{1/3}$ $O_2$, $LiNi_{0.8}Co_{0.1}Mn_{0.1}O_2$, $LiNi_{0.92}Co_{0.05}Al_{0.03}O_2$, $LiNi_{0.94}Co_{0.03}Al_{0.3}O_2$, $LiNi_{0.88}Co_{0.06}Al_{0.06}O_2$, $LiNi_{0.96}Co_{0.02}Al_{0.02}O_2$, $LiNi_{0.93}Co_{0.04}Al_{0.03}O_2$, $LiNi_{0.8}Co_{0.15}Al_{0.05}O_2O_2$, $LiNi_{0.75}Co_{0.20}Al_{0.05}O_2$, $LiNi_{0.92}Co_{0.05}Mn_{0.03}O_2$, $LiNi_{0.94}Co_{0.03}Mn_{0.03}O_2$, $LiNi_{0.88}Co_{0.06}Mn_{0.06}O_2$, $LiNi_{0.96}Co_{0.02}Mn_{0.2}O_2$, $LiNi_{0.93}Co_{0.04}Mn_{0.03}O_2$, $LiNi_{0.8}Co_{0.15}Mn_{0.05}O_2O_2$, $LiNi_{0.75}Co_{0.020}Mn_{0.05}O_2$, $LiNi_{0.6}Co_{0.2}Mn_{0.2}O_2$, $LiNi_{0.7}Co_{0.15}Mn_{0.15}O_2$, $LiNi_{0.7}Co_{0.1}Mn_{0.2}O_2$, $LiNi_{0.5}Co_{0.2}Mn_{0.3}O_2$, $LiNi_{1/3}$ $Co_{1/3}$ $Mn_{1/3}$ $O_2$, $LiNi_{0.8}Co_{0.1}Mn_{0.1}O_2$, $LiNi_{0.85}Co_{0.1}Al_{0.05}O_2$, and/or $LiNi_{0.85}Co_{0.1}Al_{0.05}O_2$.

The nickel-based active material may have similar/same particle structure and characteristics to/as the aforementioned nickel-based active material precursor, except that lithium ions are arranged in a crystal structure and hydroxides are changed to oxides.

Because the secondary particle included in the nickel-based active material has multiple centers and includes a plurality of particulate structures arranged in an isotropic array, the travel distance of lithium ions and electrons from the surface of the secondary particle and the center of the secondary particle is reduced, so that the intercalation and desorption (e.g., deintercalation) of lithium ions are easy (e.g., suitable), and the transmission (e.g., transfer) of electrons is easy (e.g., suitable). Further, because the particulate structure included in the nickel-based active material includes the porous core portion and the primary particles radially arranged on the porous core portion, the volume of the nickel-based active material is effectively buffered during charging and discharging, and thus the stress of the nickel-based active material may be reduced. Accordingly, the nickel-based active material obtained from the aforementioned nickel-based active material precursor has better capacity characteristics with respect to a related art nickel-based active material with the same composition even when the content of nickel is not increased.

The Ni-based active material may have an overall porosity of 1 to 8%, for example, 1.5% to 7.3%. The outer portion of the Ni-based active material has a lower porosity than that of the inner portion. The outer portion has a closed porosity of 0.1 to 2.5%, for example, 0.1 to 2% and the inner portion has a closed porosity of 3 to 30%. The term "closed porosity" refers to the fraction of the closed pores (pores that the electrolytic solution cannot penetrate) with respect to a total volume of pores.

Because the Ni-based active material according to an embodiment includes radial plate particles, diffusion of lithium ions increases and stress caused by a volume change is suppressed during charging and discharging lithium ions, thereby inhibiting occurrence of cracks. In addition, formation of surface resistant layers is reduced during a manufacturing process and lithium ions is diffused in more directions on the surface, and thus an active surface area for diffusion of lithium ions increases.

As used herein, the term "multi-center" refers to that one particle has a plurality of centers. In the multi-center particle, the travel distance of lithium ions from the surface of the particle to the center (e.g., one or more centers) of the particle is reduced. Because the travel distance of lithium ions is reduced, a particulate structure having reduced internal resistance, increased charge-discharge efficiency, and long lifetime is obtained.

The nickel-based active material includes a secondary particle including a plurality of particulate structures, and each of the particulate structure includes a porous core portion and a shell portion including primary particles radially arranged on the porous core portion. In 50% or more of the primary particles constituting the surface of the secondary particle, a major axis of each of the primary particles is aligned in the normal direction of the surface of the secondary particle. For example, in 60% to 80% of the primary particles constituting the surface of the secondary particle, the major axis of each of the primary particles is aligned in the normal direction of the surface of the secondary particle. In 50% or more of the primary particles constituting the surface of the secondary particle, the major axis of each of the primary particles is aligned in the normal direction of the surface of the secondary particle. In 50% or more of the primary particles constituting the surface of the secondary particle, the direction of the major axis of each of the primary particles is the [110] direction. In 60% to 80% of the primary particles constituting the surface of the secondary particle, the major axis of each of the primary particles is aligned in the normal direction of the surface of the secondary particle. In 60% to 80% of the primary particles constituting the surface of the secondary particle, the direction of the major axis of each of the primary particles is the [110] direction. The (110) plane of the primary particle is a crystal plane where lithium ions are injected into and discharged from the nickel-based active material. When the major axis of the primary particle at the outermost of the secondary particle is aligned in the normal direction of the surface of the secondary particle, the diffusion of lithium ions on the interface between the nickel-based active material and the electrolyte is easy (e.g., suitable). The intercalation and deintercalation of lithium ions in the nickel-based active material is easy (e.g., suitable), and the diffusion distance of lithium ions is reduced. The primary particle included in the nickel-based active material includes a plate particle, the major axis of the plate particle is aligned in the normal direction of the surface of the secondary particle, and the ratio of thickness to length of the plate particle may be about 1:2 to about 1:20.

The method of preparing the nickel-based active material from the nickel-based active material precursor is not particularly limited, but may be, for example, a dry method.

The nickel-based active material may be prepared by mixing a lithium precursor and the nickel-based active material precursor at a set or predetermined molar ratio and primarily heat-treating (low-temperature heat-treating) the mixture at about 600° C. to about 800° C.

The Ni-based active material having desired net density and porosity may be obtained by performing a pretreatment process under an oxidizing gas atmosphere at 400° C. to 700° C. for 1 hour to 3 hours before performing the primary heat treatment. For example, the pretreatment process may be performed at 650° C. for 2 hours.

As the lithium precursor, for example, lithium hydroxide, lithium fluoride, lithium carbonate, or a mixture thereof is utilized. The mixing ratio of the lithium precursor and the nickel-based active material precursor is stoichiometrically adjusted such that the nickel-based active material of Formula 2 is prepared.

The mixing of the lithium precursor and the nickel-based active material precursor may be performed by dry mixing or utilizing a mixer. The dry mixing may be carried out by milling. The conditions of the milling are not particularly limited, but the milling may be carried out such that the precursor utilized as a start material is hardly deformed (e.g., atomized). The size of the lithium precursor mixed with the nickel-based active material precursor may be previously controlled. The size (average particle diameter) of the lithium precursor is in a range of about 5 μm to about 15 μm, for example, about 10 µm. A desired mixture may be obtained by milling the lithium precursor having such a size and the nickel-based active material precursor at a rotation speed of about 300 rpm to 3,000 rpm. When the temperature in the mixer increases to 30° C. or higher during the milling process, a cooling process may be performed to maintain the temperature in the mixer at room temperature (25° C.).

The low-temperature heat treatment is carried out under an oxidation gas atmosphere. The oxidation gas atmosphere is obtained by utilizing oxidation gas such as oxygen or air. For example, the oxidation gas includes about 10 vol % to about 20 vol % of oxygen or air and about 80 vol % to about 90 vol % of inert gas. The low-temperature heat treatment may be carried out at a temperature below densification temperature as the reaction of the lithium precursor and the nickel-based active material precursor proceeds. The densification temperature is a temperature at which sufficient crystallization may be achieved to realize a charging capacity that the active material may provide. The low-temperature heat treatment may be carried out at about 600° C. to about 800° C., for example, about 650° C. to about 800° C. The low-temperature heat treatment time varies depending on the heat treatment temperature and/or the like, but may be, for example, about 3 hours to about 10 hours.

The method of preparing the nickel-based active material may further include a secondary heat treatment (high-temperature heat treatment) performed under an oxidation gas atmosphere in which exhaust gas is suppressed from the inside of the reactor after the low-temperature heat treatment. The high-temperature heat treatment is carried out, for example, at about 700° C. to about 900° C. The high-temperature heat treatment time varies depending on the heat treatment temperature and/or the like, but may be, for example, about 3 hours to about 10 hours.

In the Ni-based active material obtained in the above-described process, the content of lithium phosphate may be about 0.03 wt % to about 0.4 wt %, about 0.03 wt % to about 0.3 wt %, about 0.03 wt % to about 0.2 wt %, about 0.03 wt % to about 0.1 wt %, about 0.03 wt % to about 0.08 wt %, about 0.03 wt % to about 0.06 wt %, about 0.03 wt % to about 0.05 wt %, or about 0.03 wt % to about 0.04 wt % based on the total weight of the Ni-based active material.

According to another embodiment, the content of the lithium phosphate in the Ni-based active material is about 0.04 wt % to about 0.4 wt % based on the total weight of the Ni-based active material.

The total weight of the Ni-based active material is a weight of the Ni-based active material including lithium phosphate. When the content of the lithium phosphate is within the above ranges, a Ni-based active material having improved electrochemical characteristics and excellent (e.g., suitable) capacity characteristics may be obtained.

In the Ni-based active material according to an embodiment, the content of lithium phosphate present on the surface of the secondary particle is greater than the content of lithium phosphate present in the porous core portion and the shell portion. Also, according to another embodiment, in the Ni-based active material, the content of the lithium phosphate present between the plurality of primary particles of the shell portion may be greater than the content of lithium phosphate present in the porous core portion.

In the Ni-based active material according to another embodiment, the content of phosphorus present on the surface of the secondary particle is greater than the content of phosphorus present in the porous core portion and the shell portion. Also, according to an embodiment, in the Ni-based active material, the content of phosphorus present between the plurality of primary particles of the shell portion may be greater than the content of phosphorus present in the porous core portion. In this regard, phosphorus may refer to $PO_3$, $PO_4$ or any combination thereof, for example, $PO_3$.

A lithium secondary battery according to another embodiment includes a positive electrode including the above-described Ni-based active material for a lithium secondary battery, a negative electrode, and an electrolyte interposed therebetween.

Methods of preparing the lithium secondary battery are not particularly limited, but may be, any method commonly utilized in the related art may also be utilized. For example, the lithium secondary battery may be prepared in the following method.

The positive electrode and the negative electrode are fabricated by applying a composition for forming a positive active material layer and a composition for forming a negative active material layer onto current collectors and drying the applied compositions, respectively.

In some embodiments, the positive electrode and the negative electrode are fabricated by forming a positive active material layer and a negative active material layer by applying a composition for forming a positive active material layer and a composition for forming a negative active material layer onto current collectors and drying the applied compositions, respectively.

The composition for forming a positive active material layer is prepared by mixing a positive active material, a conductive material, a binder, and a solvent. As the positive active material, a positive active material according to an embodiment is utilized.

The binder of the positive electrode increases adhesive force among particles of the positive active material and adhesive force between the positive active material and a positive current collector. Examples of the binder may include polyvinylidene fluoride (PVDF), a vinylidene fluoride/hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene butylene rubber (SBR), fluorine rubber, and various suitable copolymers. These compounds may be utilized alone or in combination of at least two thereof.

The conductive material is not particularly limited as long as it does not cause any chemical change in the corresponding battery and has conductivity. Examples of the conductive material may include: graphite such as natural graphite and/or artificial graphite; carbon-based materials such as carbon black, acetylene black, ketjen black, channel black, furnace black, lamp black, and/or thermal black; conductive fiber such as carbon nanotube, carbon fiber, and/or metal fiber; carbon fluoride; metal powder such as aluminum powder and/or nickel powder; conductive whisker such as zinc oxide and/or potassium titanate; conductive metal oxide such as titanium oxide; and conductive polymers such as polyphenylene derivatives.

The content of the conductive material may be in a range of 1 part by weight to 10 parts by weight or 1 part by weight to 5 parts by weight based on 100 parts by weight of the positive active material. When the content of the conductive material is within the above ranges, an electrode finally obtained has excellent (e.g., suitable) conductivity.

Non-limiting examples of the solvent may include N-methylpyrrolidone and the content of the solvent is in a range of 20 parts by weight to 200 parts by weight based on 100 parts by weight of the positive active material. When the amount of the solvent is within the above range, the positive active material is formed easily.

The positive current collector is not limited as long as it has a thickness of about 3 µm to about 500 µm and has high conductivity without causing any chemical change in the corresponding battery. For example, the positive current collector may include stainless steel, aluminum, nickel, titanium, or fired carbon, or may include aluminum or stainless steel surface-treated with carbon, nickel, titanium or silver. The positive current collector may have fine irregularities on the surface thereof to increase the binding force of the positive active material, and may have various suitable forms such as film, sheet, foil, net, porous body, foam, and/or non-woven fabric.

Separately, a negative active material, a binder, and a solvent are mixed to prepare the composition for forming a negative active material layer.

As the negative active material, a material capable of absorbing and discharging lithium ions is utilized. Non-limiting examples of the negative active material may include carbon-based materials such as graphite and/or carbon, a lithium metal and an alloy thereof, and a silicon oxide-based material. According to an embodiment of the present disclosure, silicon oxide is utilized.

Non-limiting examples of the binder of the negative electrode may include a polyvinylidene fluoride/hexafluoropropylene copolymer (PVDF-co-HFP), polyvinylidene fluoride, polyacrylonitrile, polymethyl methacrylate, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, polyacrylic acid, ethylene-propylene-diene terpolymer (EPDM), sulfonated EPDM, styrene butylene rubber (SBR), fluorine rubber, one or more of these compounds in which hydrogen is substituted with Li, Na, Ca, and/or the like, and/or various suitable copolymers.

The negative active material layer may further include a conductive material. The conductive material is not particularly limited as long as it does not cause any chemical change in the corresponding battery and has conductivity.

Examples of the conductive material may include: graphite such as natural graphite and/or artificial graphite; carbon black such as carbon black, acetylene black, ketjen black, channel black, furnace black, lamp black, and/or thermal black; conductive fiber such as carbon fiber and/or metal fiber; conductive tube such as carbon nanotube; fluorocarbon; metal powder such as aluminum powder and/or nickel powder; conductive whisker such as zinc oxide and/or potassium titanate; conductive metal oxide such as titanium oxide; and conductive materials such as polyphenylene derivatives. The conductive material may be, in some embodiments, carbon black, or, carbon black having an average particle diameter of dozens of nanometers.

The content of the conductive material may be 0.01 parts by weight to 10 parts by weight, 0.01 parts by weight to 5 parts by weight, or 0.1 parts by weight to 2 parts by weight based on 100 parts by weight of a total weight of the negative active material layer.

The composition for forming a negative active material layer may further include a thickener. As the thickener, at least one selected from carboxymethyl cellulose (CMC), carboxyethyl cellulose, starch, regenerated cellulose, ethyl cellulose, hydroxymethyl cellulose, hydroxyethyl cellulose, hydroxypropyl cellulose, styrene butadiene rubber (SBR), and polyvinyl alcohol may be utilized, for example, CMC may be utilized.

The content of the solvent may be in a range of 100 parts by weight to 300 parts by weight based on 100 parts by weight of the total weight of the negative active material. When the content of the solvent is within the above range, the negative active material layer may be easily (e.g., suitably) formed.

The negative current collector may have a thickness of 3 µm to 500 µm. This negative current collector is not particularly limited as long as it has high conductivity without causing any chemical change in the corresponding battery. For example, the negative current collector may include copper, stainless steel, aluminum, nickel, titanium, or fired carbon, may include copper or stainless steel surface-treated with carbon, nickel, titanium or silver, or may include an aluminum-cadmium alloy. Similar to the positive current collector, the negative current collector may have fine irregularities on the surface thereof to increase the binding force of the positive active material and may have various suitable forms such as film, sheet, foil, net, porous body, foam, and non-woven fabric.

A separator is interposed between the positive electrode and the negative electrode fabricated according to the above-described process.

The separator may have a pore diameter of about 0.01 µm to about 10 µm and a thickness of about 5 µm to about 300 µm. For example, as the separator, a sheet or non-woven fabric made of an olefin-based polymer such as polypropylene and/or polyethylene, and/or glass fiber may be utilized. When a solid electrolyte such as a polymer is utilized as the electrolyte, the solid electrolyte may also act as a separator.

A non-aqueous electrolyte containing a lithium salt includes a non-aqueous electrolyte and a lithium salt. As the non-aqueous electrolyte, a non-aqueous electrolytic solution, an organic solid electrolyte, or an inorganic solid electrolyte may be utilized.

Non-limiting examples of the non-aqueous electrolytic solvent may include aprotic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxyethane, 2-methyl tetrahydrofuran, dimethyl sulfoxide, 1,3-dioxolane, N,N-formamide, N,N-dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ethers, methyl propionate, and ethyl propionate.

Non-limiting examples of the organic solid electrolyte may include polyethylene derivatives, polyethylene oxide derivatives, polypropylene oxide derivatives, phosphate ester polymers, polyester sulfide, polyvinyl alcohols, and polyvinylidene fluoride.

Non-limiting examples of the inorganic solid electrolyte may include a nitride, halide, or sulfate of Li such as $Li_3N$, LiI, $Li_5NI_2$, $Li_3N$—LiI—LiOH, $LiSiO_4$, $Li_2SiS_3$, $Li_4SiO_4$, $Li_4SiO_4$—LiI—LiOH, and/or $Li_3PO_4$—$Li_2S$—$SiS_2$.

The lithium salt is a material easily soluble in the non-aqueous electrolyte, and non-limiting examples thereof include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, $(FSO_2)_2NLi$, lithium chloroborate, lower aliphatic carboxylic acid lithium, and lithium tetraphenylborate imide.

Figure 8:
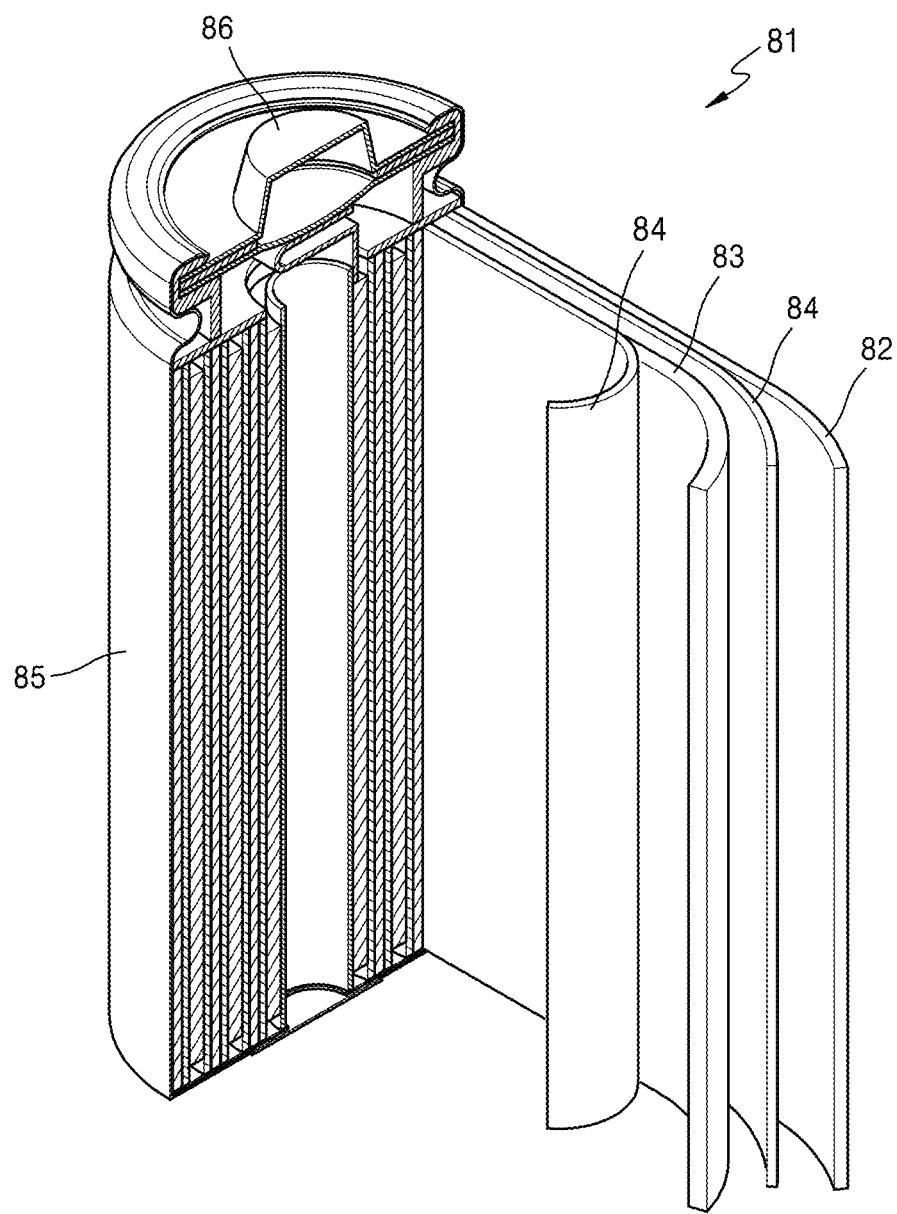
FIG. 8 is a schematic view of a lithium secondary battery according to an embodiment.
Figure 9A:
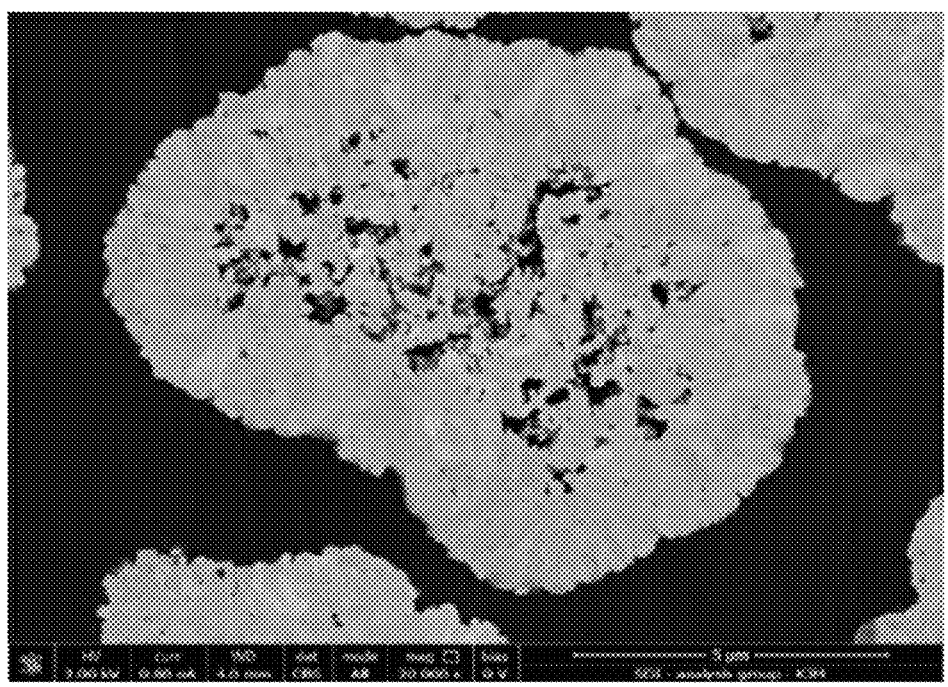
FIGS. 9A to 9E are SEM images of Ni-based active materials prepared in Example 1, Example 7, Comparative Example 1, Comparative Example 2 and Comparative Example 3, respectively.
Figure 9B:
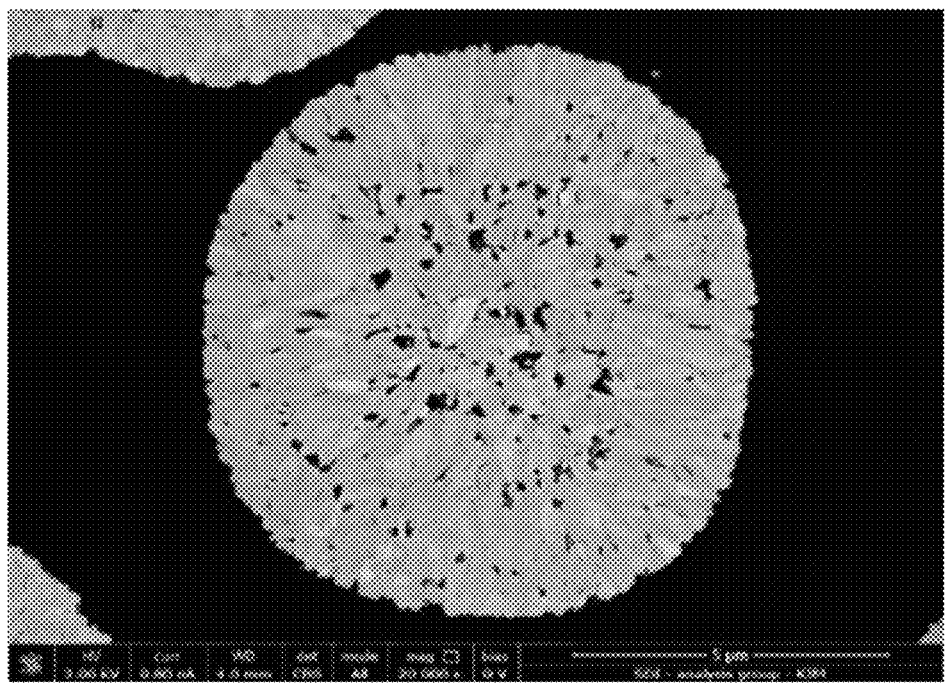
Figure 9C:
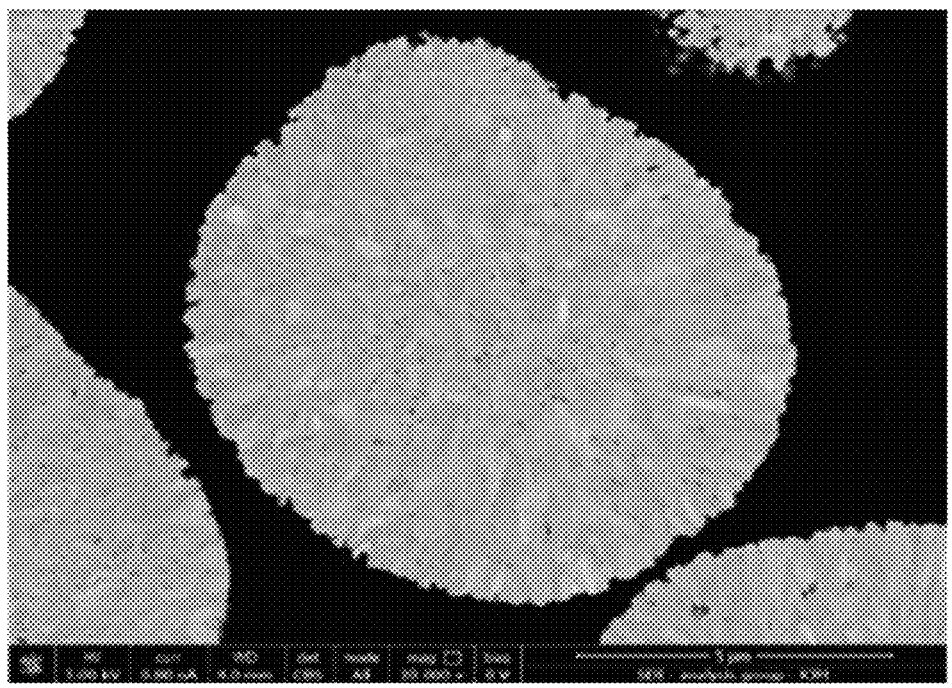
Figure 9D:
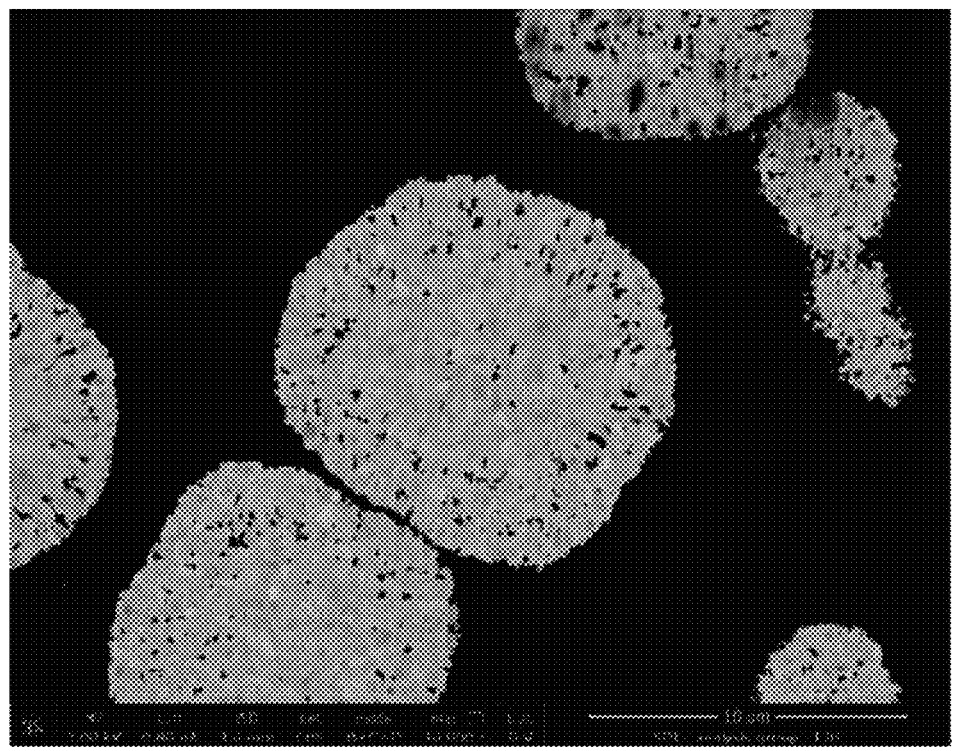
Figure 9E:
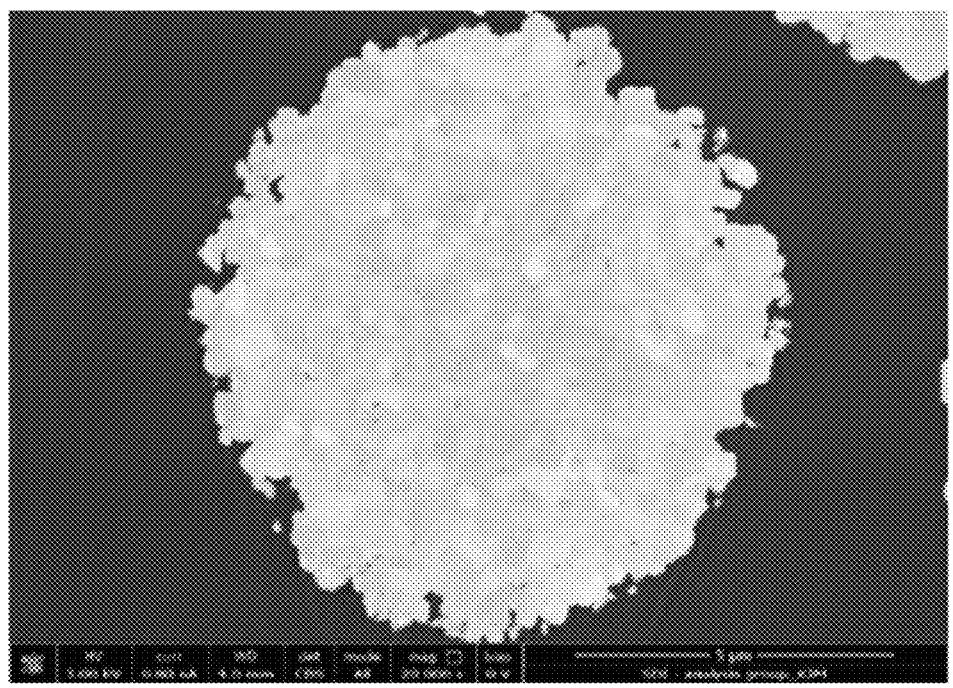

FIG. 8 is a cross-sectional view schematically illustrating a lithium secondary battery according an embodiment.

Referring to FIG. 8, a lithium secondary battery 81 includes a positive electrode 28, a negative electrode 82, and a separator 84. The positive electrode 83, the negative electrode 82, and the separator 84 are wound or folded and accommodated in a battery case 85. The separator 84 is between the positive electrode 83 and the negative electrode 82 according to the shape of the battery, thereby forming a battery assembly. Then, an organic electrolyte is injected into the battery case 85, and the battery case 85 is sealed with a cap assembly 86 to complete the lithium secondary battery 81. The battery case 85 may have a cylindrical shape, a rectangular shape, or a thin-film shape. For example, the lithium secondary battery 81 may be a large-sized thin-film battery. The lithium secondary battery may be a lithium ion battery. The battery assembly is accommodated in a pouch, impregnated with an organic electrolyte, and sealed, thereby completing a lithium ion polymer battery. In addition, a plurality of battery assemblies are laminated to form a battery pack, and this battery pack may be utilized in any or all devices that require high capacity and high powder. For example, the battery pack may be utilized in notebook computers, smart phones, electric vehicles, and/or the like.

In addition, due to desired (e.g., excellent) storage stability, lifespan characteristics, and high-rate characteristics at high temperature, the lithium secondary battery may be utilized in electric vehicles (EVs). For example, the lithium secondary battery may be utilized in hybrid vehicles such as plug-in hybrid electric vehicles (PHEVs).

Hereinafter, the present disclosure will be described in more detail with reference to examples and comparative examples. However, these examples are for illustrating the present disclosure, and the scope of the present disclosure is not limited thereto.

Preparation of Ni-based Active Material Precursor

Preparation Example 1: Preparation of Ni-Based Active Material Precursor (Ni:Co:Mn=6:2:2 (Molar Ratio))

A Ni-based active material precursor($Ni_{0.6}Co_{0.2}Mn_{0.2}(OH)_2$) was synthesized by a coprecipitation method. In the following preparation process, as metal raw materials for forming a Ni-based active material precursor, nickel sulfate ($NiSO_4 \cdot 6H_2O$), cobalt sulfate ($CoSO_4 \cdot 7H_2O$), and manganese sulfate ($MnSO_4 \cdot H_2O$) were dissolved in distilled water as a solvent in a molar ratio of Ni:Co:Mn=6:2:2 to prepare a mixed solution. Also, aqueous ammonia ($NH_4OH$) for forming a complex and sodium hydroxide (NaOH) as a precipitant were prepared.

(1) First Act: feed rate of 5.10 L/hr, stirring power of 5.0 kW/m$^3$, 0.5 M $NH_3$, and pH of 11.30 to 11.50

Aqueous ammonia having a concentration of 0.5 mol/L (M) was added to a reactor equipped with a stirrer. 2 mol/L (M) of metal raw materials (mixed solution of nickel sulfate, cobalt sulfate, and manganese sulfate) were supplied at a feed rate of 5.10 L/hr and 0.5 mol/L (M) of aqueous ammonia was supplied at a feed rate of 0.77 L/hr while maintaining a stirring power of 5.0 kW/m$^3$ and a reaction temperature of 50° C. Then, sodium hydroxide (NaOH) was supplied to maintain the pH. The pH of the reaction mixture in the reactor was maintained at 11.30 to 11.50. The first act was performed while stirring at this pH range for 6 hours.

(2) Second Act: feed rate of 6.38 L/hr, stirring power of 3.0kW/m$^3$, 0.6 M $NH_3$, and pH of 10.65 to 10.75

After the first act reaction was completed, 2 mol/L (M) of the metal raw materials were supplied at a feed rate of 6.38 L/hr and 0.6 mol/L (M) of aqueous ammonia was supplied at a feed rate of 1.01 L/hr while reducing stirring power to 3.0 kW/m$^3$ and maintaining reaction temperature at 50° C. Then, sodium hydroxide (NaOH) was supplied to maintain the pH. The pH of the reaction mixture in the reactor was maintained at 10.65 to 10.75. The second act was performed while stirring until an average particle diameter D50 of particles contained in the reactor reached about 10 μm. Then, a part of the product obtained in the second act reaction was removed from the reactor to reduce the concentration of the product.

(3) Third Act: feed rate of 8.50 L/hr, stirring power of 0.8kW/m$^3$, 0.7 M $NH_3$, and pH of 10.10 to 10.20

After the second act reaction was completed and the average particle diameter D50 of the particles contained in the reactor reached about 10 μm, 2 mol/L (M) of the metal raw materials were supplied at a feed rate of 8.50 L/hr and 0.7 mol/L (M) of aqueous ammonia was supplied at a feed rate of 1.18 L/hr while reducing stirring power to 0.8 kW/m$^3$ and maintaining reaction temperature at 50° C., and NaOH was added to maintain the pH. The pH of the reaction mixture in the reactor was maintained at 10.10 to 10.20. The third reaction was performed while stirring at this pH range for 6 hours. Subsequently, a slurry solution contained in the reactor was filtered and washed with high-purity distilled water. A preliminary Ni-based active material precursor that is a resultant obtained by washing as described above was impregnated in a mixture of phosphoric acid ($H_3PO_4$) and water at 25° C. for 2 hours and dried at 150° C. for 12 hours to obtain a Ni-based active material precursor adsorbed with phosphorus. In the mixture of phosphoric acid and water (e.g., aqueous solution of phosphoric acid), the content of phosphoric acid is 0.2 parts by weight based on 100 parts by weight of the mixture.

The precursor adsorbed with the phosphorus was dried in a hot-air oven for 24 hours to obtain a Ni-based active material precursor ($Ni_{0.6}Co_{0.2}Mn_{0.2}(OH)_2$) adsorbed with phosphorus.

Phosphorus was present in the porous core portion, between the plurality of primary particles of the shell portion, and on the surface of the secondary particle in the phosphorus-containing Ni-based active material precursor. In the finally obtained Ni-based active material precursor ($Ni_{0.6}Co_{0.2}Mn_{0.2}(OH)_2$), the total content of phosphorus (P) was 0.05 wt % based on the total weight of the Ni-based active material precursor. In this regard, phosphorus refers to $PO_3$, $PO_4$ or any combination thereof.

Preparation Example 2: Preparation of Ni-Based Active Material Precursor

A Ni-based active material precursor was prepared in the same manner as in Preparation Example 1, except that the content of phosphoric acid was adjusted in the mixture of phosphoric acid ($H_3PO_4$) and water such that the total content of phosphorus was 1 wt % in the finally obtained Ni-based active material precursor ($Ni_{0.6}Co_{0.2}Mn_{0.2}(OH)_2$). The total content of phosphorus was 1 wt % in the finally obtained Ni-based active material precursor ($Ni_{0.6}Co_{0.2}Mn_{0.2}(OH)_2$) based on the total weight of the Ni-based active material precursor.

Preparation Example 3: Preparation of Ni-Based Active Material Precursor

A Ni-based active material precursor was prepared in the same manner as in Preparation Example 1, except that the content of phosphoric acid was adjusted in the mixture of phosphoric acid ($H_3PO_4$) and water such that the total content of phosphorus was 0.5 wt % in the finally obtained Ni-based active material precursor ($Ni_{0.6}Co_{0.2}Mn_{0.2}(OH)_2$). The total content of phosphorus was 0.5 wt % in the finally obtained Ni-based active material precursor ($Ni_{0.6}Co_{0.2}Mn_{0.2}(OH)_2$) based on the total weight of the Ni-based active material precursor.

Preparation Example 4: Preparation of Ni-Based Active Material Precursor

A Ni-based active material precursor was prepared in the same manner as in Preparation Example 1, except that the content of phosphoric acid was adjusted in the mixture of phosphoric acid ($H_3PO_4$) and water such that the total content of phosphorus was 2 wt % in the finally obtained Ni-based active material precursor ($Ni_{0.6}Co_{0.2}Mn_{0.2}(OH)_2$). The total content of phosphorus was 2 wt % in the finally obtained Ni-based active material precursor ($Ni_{0.6}Co_{0.2}Mn_{0.2}(OH)_2$) based on the total weight of the Ni-based active material precursor.

Preparation Example 5: Preparation of Ni-Based Active Material Precursor (Ni:Co:Mn=7:1.5:1.5 (Molar Ratio))

A Ni-based active material precursor ($Ni_{0.7}Co_{0.15}Mn_{0.15}(OH)_2$) was synthesized in the same manner as in Preparation Example 1, except that the mixed solution was prepared such that a molar ratio of the nickel sulfate ($NiSO_4.6H_2O$), cobalt sulfate ($CoSO_4.7H_2O$), and manganese sulfate ($MnSO_4.H_2O$), as metal raw materials, was Ni:Co:Mn=7:1.5:1.5 instead of Ni:Co:Mn=6:2:2 in Preparation Example 1.

Preparation Example 6: Preparation of Ni-Based Active Material Precursor (Ni:Co:Mn=7:1:2 (Molar Ratio))

A Ni-based active material precursor ($Ni_{0.7}Co_{0.1}Mn_{0.2}(OH)_2$) was synthesized in the same manner as in Preparation Example 1, except that the mixed solution was prepared such that a molar ratio of the nickel sulfate ($NiSO_4.6H_2O$), cobalt sulfate ($CoSO_4.7H_2O$), and manganese sulfate ($MnSO_4.H_2O$), as metal raw materials, was Ni:Co:Mn=7:1:2 instead of Ni:Co:Mn=6:2:2 in Preparation Example 1.

Comparative Preparation Example 1: Preparation of Ni-Based Active Material Precursor (Ni:Co:Mn=6:2:2 (Molar Ratio))

First and second acts were performed in the same manner as in Preparation Example 1.
Third Act: feed rate of 8.50 L/hr, stirring power of 0.8kW/$m^3$, 0.7 M $NH_3$, and pH of 10.10 to 10.20
After the second act reaction was completed and the average particle diameter D50 of the particles contained in the reactor reached about 10 μm, 2 mol/L (M) of the metal raw materials were supplied at a feed rate of 8.50 L/hr and 0.7 mol/L (M) of aqueous ammonia was supplied at a feed rate of 1.18 L/hr while reducing stirring power to 0.8 kW/$m^3$ and maintaining reaction temperature at 50° C., and NaOH was added to maintain the pH. The pH of the reaction mixture in the reactor was maintained at 10.10 to 10.20. The third act reaction was performed while stirring at this pH range for 6 hours.

After the third act reaction was completed, the slurry solution was filtered and washed with high-purity distilled water. Subsequently, the washed resultant was dried in a hot-air oven for 24 hours to obtain a Ni-based active material precursor ($Ni_{0.6}Co_{0.2}Mn_{0.2}(OH)_2$).

Comparative Preparation Example 2

The Ni-based active material precursor ($Ni_{0.6}Co_{0.2}Mn_{0.2}(OH)_2$) obtained in Comparative Preparation Example 1 and $NH_4H_2PO_4$ as a phosphorus compound were mixed by milling at 250 rpm to obtain a mixture. The mixture was heat-treated in an oxygen atmosphere at about 700° C. for 6 hours to obtain a Ni-based active material precursor coated with $NH_4H_2PO_4$.

Comparative Preparation Example 3

A Ni-based active material precursor was prepared in the same manner as in Preparation Example 1, except that aluminum phosphate was utilized instead of phosphoric acid ($H_3PO_4$).

In the case of Comparative Preparation Example 3, because aluminum phosphate, unlike phosphoric acid, is not an ionizable phosphorus compound, it is difficult to coat phosphorus in pores of the porous core portion of the Ni-based active material precursor and/or grain boundaries of the primary particles of the shell portion utilizing the aluminum phosphate.

Comparative Preparation Example 4

A Ni-based active material precursor was prepared in the same manner as in Preparation Example 1, except that the content of phosphoric acid was adjusted in the mixture of phosphoric acid ($H_3PO_4$) and water (e.g., aqueous solution of phosphoric acid) such that the total content of phosphorus was 0.005 wt % in the finally obtained Ni-based active material precursor ($Ni_{0.6}Co_{0.2}Mn_{0.2}(OH)_2$). The total content of phosphorus was 0.005 wt % in the finally obtained Ni-based active material precursor ($Ni_{0.6}Co_{0.2}Mn_{0.2}(OH)_2$) based on the total weight of the Ni-based active material precursor In the Ni-based active material precursor prepared in Comparative Preparation Example 4, effects obtained by including phosphorus were insignificant.

Comparative Preparation Example 5

A Ni-based active material precursor was prepared in the same manner as in Preparation Example 1, except that the content of phosphoric acid was adjusted in the mixture of phosphoric acid ($H_3PO_4$) and water (e.g., aqueous solution of phosphoric acid) such that the total content of phosphorus was 3 wt % in the finally obtained Ni-based active material precursor ($Ni_{0.6}Co_{0.2}Mn_{0.2}(OH)_2$). The total content of phosphorus was 3 wt % in the finally obtained Ni-based active material precursor ($Ni_{0.6}Co_{0.2}Mn_{0.2}(OH)_2$) based on the total weight of the Ni-based active material precursor.

Most of the pores of the porous inner portion disappeared in the Ni-based active material precursor prepared in Comparative Preparation Example 5. When a positive electrode including a Ni-based active material obtained therefrom is utilized, effects on improving lifespan characteristics of a lithium secondary battery were insignificant.

Preparation of Ni-Based Active Material

Example 1

Lithium hydroxide (LiOH) was added to a composite metal hydroxide ($Ni_{0.6}Co_{0.2}Mn_{0.2}(OH)_2$), which is the phosphorus-containing Ni-based active material precursor prepared in Preparation Example 1 and mixed at a molar ratio of 1:1 by a dry method. The mixture was heat-treated at about 700° C. for 6 hours in an oxygen atmosphere to obtain a Ni-based active material ($LiNi_{0.6}Co_{0.2}Mn_{0.2}O_2$). The obtained Ni-based active material had an inner portion having a porous structure and an outer portion having a radial arrangement structure. The Ni-based active material was heat-treated under atmospheric conditions at about 800° C. for 6 hours to obtain a Ni-based active material ($LiNi_{0.6}Co_{0.2}Mn_{0.2}O_2$) including a secondary particle in which primary particle aggregates having at least two radial centers are arranged in a multi-center isotropic array.

In the Ni-based active material, the content of lithium phosphate was 0.15 wt % based on the total weight of the lithium phosphate-containing Ni-based active material. The structure of the Ni-based active material is identical to that of the Ni-based active material precursor.

As used herein, the term "radial center" refers to a center of a particulate structure including the porous core portion and the shell portion including primary particles radially arranged on the porous core portion as shown in FIG. 1A.

Examples 2 to 6

Ni-based active materials were prepared in the same manner as in Example 1, except that the Ni-based active material precursors prepared in Preparation Examples 2 to 6 were respectively utilized instead of the Ni-based active material precursor of Preparation Example 1.

Example 7

Ni-based active material particles were obtained in the same manner as in Example 1, except that the primary heat treatment was performed at 750° C. for 10 hours and the secondary heat treatment was performed at 850° C. for 6 hours.

Comparative Examples 1 to 5

Ni-based active materials were prepared in the same manner as in Example 1, except that the Ni-based active material precursors prepared in Comparative Preparation Examples 1 to 5 were respectively utilized instead of the Ni-based active material precursor of Preparation Example 1.

The Ni-based active material obtained in Comparative Example 2 was a product prepared utilizing the Ni-based active material precursor of Comparative Preparation Example 2, and thus lithium phosphate is formed only on the surface of the Ni-based active material. When observing the surface with a scanning electron microscope (SEM), lithium phosphate was not uniformly formed but non-uniform aggregates of lithium phosphate were formed on the surface.

Also, the Ni-based active material obtained in Comparative Example 5 was a product prepared utilizing the Ni-based active material precursor of Comparative Preparation Example 5, and thus most pores of the porous inner portion of the Ni-based active material precursor disappeared. When a coin cell is prepared utilizing the Ni-based active material according to the following method, effects on improving lifespan characteristics of the coin cell were insignificant.

Comparative Example 5

Lithium hydroxide ($LiOH.H_2O$) and a composite metal hydroxide ($Ni_{0.6}Co_{0.2}Mn_{0.2}(OH)_2$) with no pores in an inner portion and not radially arranged were dry mixed at a molar ratio of 1:1. The mixture was heat treated at about 870° C. for 15 hours under an atmospheric conditions. A product obtained after the primary heat treatment was subjected to a secondary heat treatment at about 500° C. for 6 hours in an oxidizing (e.g., oxygen) atmosphere to obtain secondary particles of the Ni-based active material ($LiNi_{0.6}Co_{0.2}Mn_{0.2}O_2$).

Comparative Example 6

Lithium hydroxide ($LiOH.H_2O$) and a composite metal hydroxide ($Ni_{0.6}Co_{0.2}Mn_{0.2}(OH)_2$) radially arranged and having a dense central portion and a porous outer portion were dry mixed at a molar ratio of 1:1. The mixture was heat treated at about 800° C. for 6 hours under an atmospheric condition to obtain particles of the Ni-based active material ($LiNi_{0.6}Co_{0.2}Mn_{0.2}O_2$). An inner portion of the Ni-based active material particles obtained as described above had closed pores. The outer portion of the Ni-based active material particles had open pores.

Comparative Example 7

Lithium hydroxide ($LiOH.H_2O$) and a composite metal hydroxide ($Ni_{0.6}Co_{0.2}Mn_{0.2}(OH)_2$) with no pores in an inner portion and not radially arranged were dry mixed at a molar ratio of 1:1. The mixture was heat treated at about 890° C. for 15 hours under an atmospheric condition to obtain secondary particles of the Ni-based active ($LiNi_{0.6}Co_{0.2}Mn_{0.2}O_2$).

Manufacture of Coin Cell

Manufacture Example 1

A coin cell was manufactured as follows utilizing the Ni-based active material ($LiNi_{0.6}Co_{0.2}Mn_{0.2}O_2$) obtained according to Example 1 as a positive active material.

A mixture of 96 g of the Ni-based active material ($LiNi_{0.6}Co_{0.2}Mn_{0.2}O_2$) obtained according to Example 1, 2 g of polyvinylene fluoride, 47 g of N-methyl pyrrolidone as a solvent, and 2 g of carbon black as a conductive agent was defoamed utilizing a mixer to prepare a uniformly dispersed slurry for forming a positive active material layer.

The slurry prepared in this way was applied onto an aluminum foil utilizing a doctor blade to form a thin plate, and then the thin plate was dried at 135° C. for 3 hours or more and then rolled and vacuum-dried to fabricate a positive electrode.

A 2032 type coin cell was manufactured utilizing the positive electrode and a lithium metal as a counter electrode. A separator (thickness: 16 μm) made of a porous polyethylene (PE) film was interposed between the positive electrode and the lithium metal counter electrode, and an electrolyte was injected into the separator to manufacture the 2032 type coin cell. As the electrolyte, a solution in which 1.1 M LiPF6 was dissolved in a mixed solvent in which ethylene carbonate (EC) and ethylmethyl carbonate (EMC) were mixed at a volume ratio of 3:5 was utilized.

Manufacture Example 2

A coin cell was manufactured in the same manner as in Manufacture Example 1, except that the Ni-based active material of Example 2 was utilized instead of the Ni-based active material of Example 1.

Manufacture Example 3

A coin cell was manufactured in the same manner as in Manufacture Example 1, except that the Ni-based active material of Example 3 was utilized instead of the Ni-based active material of Example 1.

Comparative Manufacture Examples 1 to 5

Coin cells were manufactured in the same manner as in Manufacture Example 1, except that the Ni-based active materials prepared in Comparative Examples 1 to 5 were respectively utilized instead of the Ni-based active material of Example 1.

Evaluation Example 1: Scanning Electron Microscope (SEM)

Figure 2E:
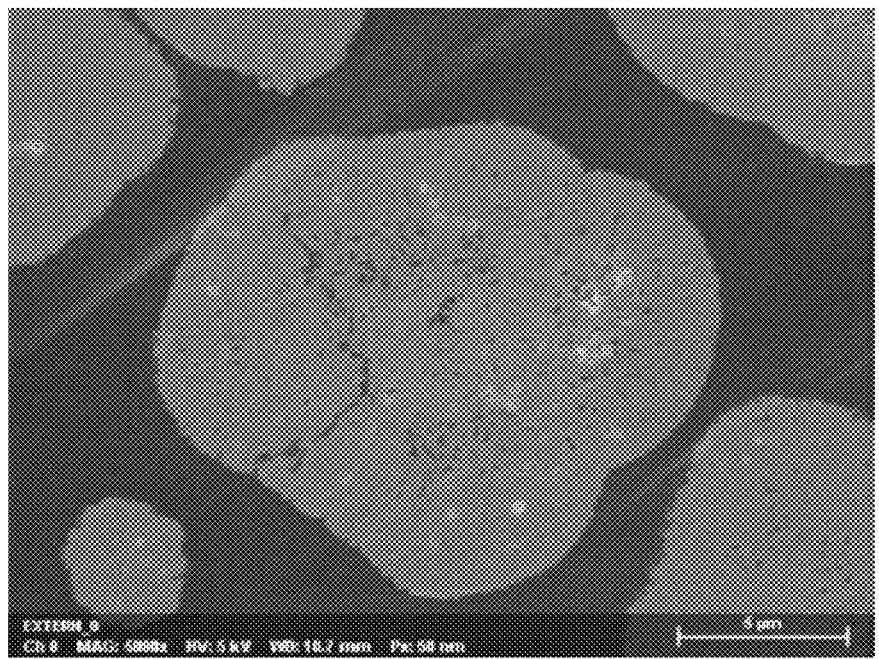
FIGS. 2E and 2F show SEM images of a cross-section of a Ni-based active material precursor prepared in Preparation Example 1 before and after phosphorus coating, respectively.
Figure 2F:
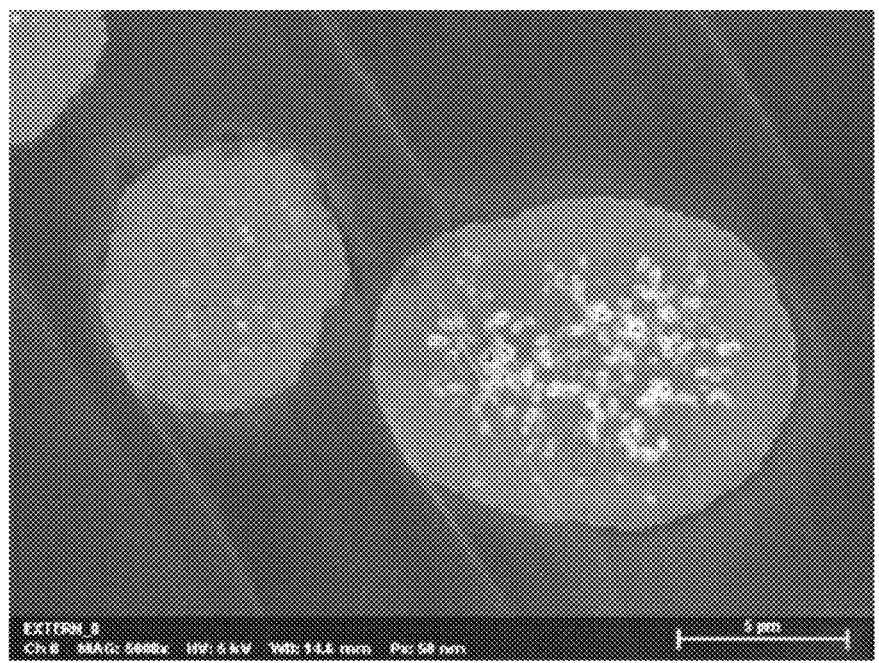

Cross-sections of the Ni-based active material precursor prepared according to Preparation Example 1 were analyzed. A Magellan 400L (FEI company) was utilized as the scanning electron microscope. Analysis results are shown in FIGS. 2E and 2F. FIG. 2E is a cross-sectional view before coating and FIG. 2F is a cross-sectional view after coating.

As shown in FIG. 2E, as a results of SEM analysis of the Ni-based active material precursor prepared according to Preparation Example 1, the precursor has an radial and empty center and the shell portion has a structure in which primary particles are radially arranged. As such, the porous core portion has pores before coating and the inner pores remained even after coating without disappearing as shown in FIG. 2F.

Evaluation Example 2: Time-of-Flight Secondary Ion Mass Spectrometry (TOF-SIMS)

The Ni-based active materials of Example 1 and Comparative Example 2 were evaluated by TOF-SIMS. TOF-SIMS analysis was performed utilizing Ion TOFS manufactured by Ion TOF. TOF-SIMS analysis was performed under the conditions of Primary ion: Bi1+, Sputter ion: Cs+.

Figure 3A:
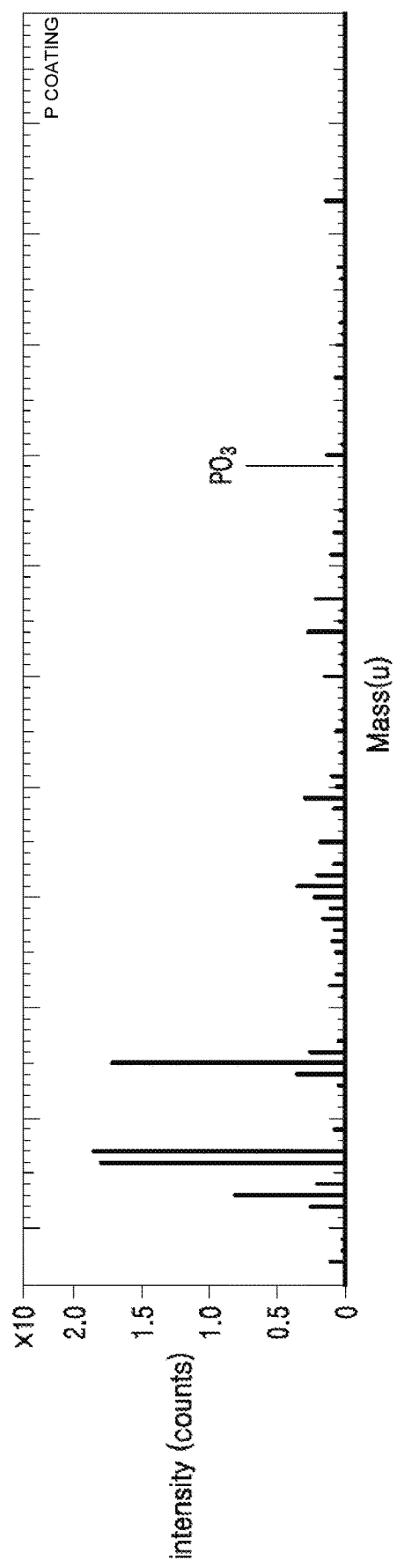
FIG. 3A shows time-of-flight secondary ion mass spectrometry (TOF-SIMS) analysis results of a Ni-based active material of Example 1.
Figure 3B:
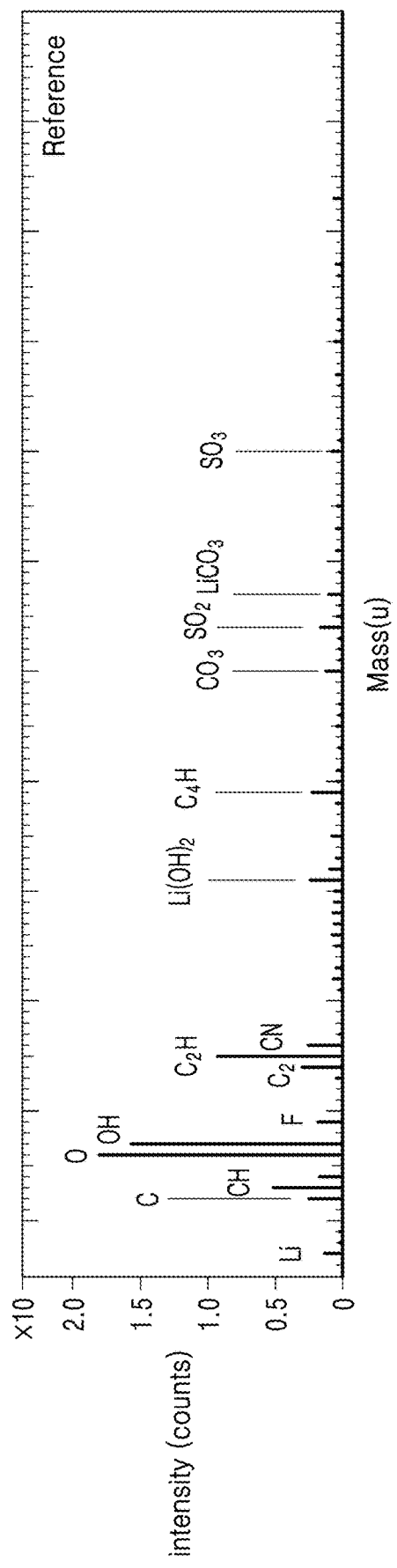
FIG. 3B shows TOF-SIMS analysis results of a Ni-based active material of Comparative Example 2.
Figure 3C:
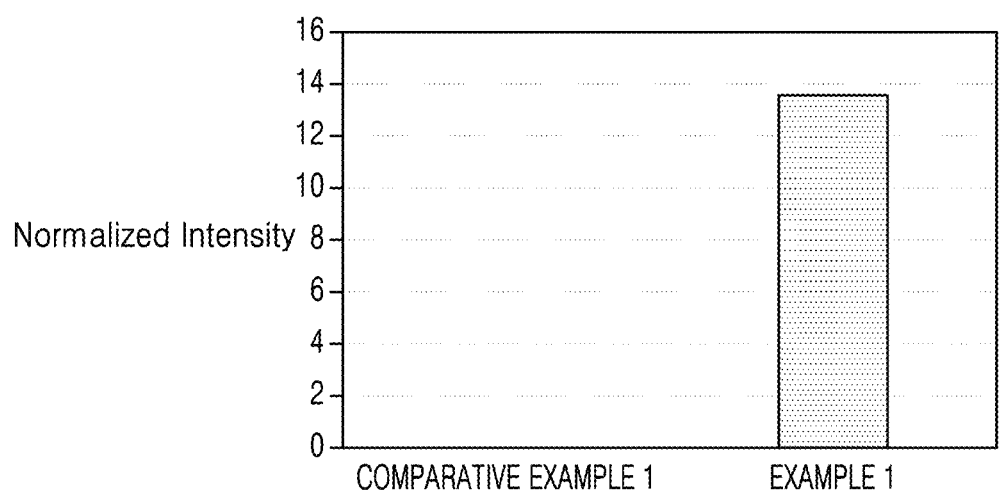
FIG. 3C shows $PO_3$ normalized intensities of Ni-based active materials of Example 1 and Comparative Example 1.
Figure 3D:
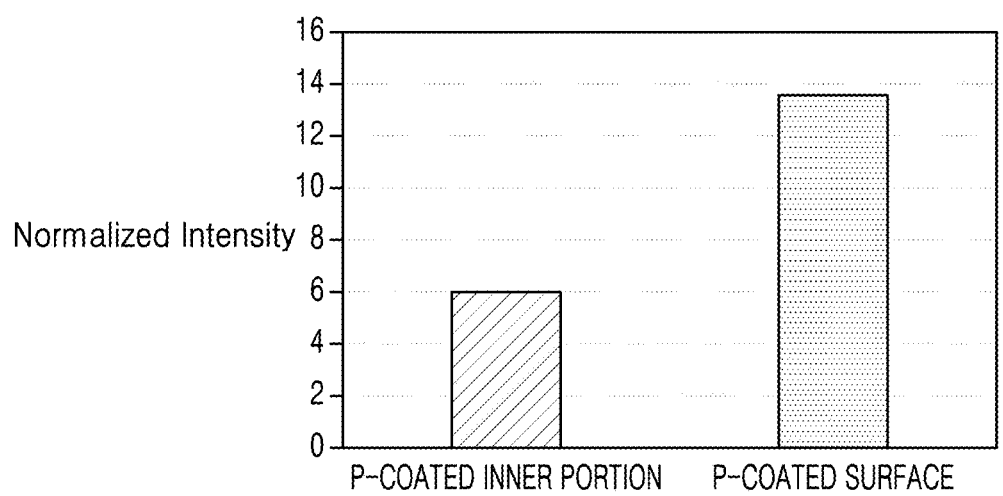
FIG. 3D shows $PO_3$ normalized intensities of a cross-section (inner portion) and a shell portion (outer portion) and the surface (outer portion) of a secondary particle of a Ni-based active material of Example 1.

TOF-SIMS spectra are shown in FIGS. 3A to 3C. FIG. 3A shows a TOF-SIMS spectrum of the surface of the secondary particle of the Ni-based active material of Example 1. FIG. 3B shows a TOF-SIMS spectrum of the surface of the secondary particle of the Ni-based active material of Comparative Example 2. In addition, FIG. 3C shows $PO_3$ normalized intensities on the surfaces of the secondary particles of the Ni-based active materials of Example 1 and Comparative Example 1. FIG. 3D shows $PO_3$ normalized intensities on the cross-section (inner portion) and the surface of the Ni-based active material of Example 1.

The P component was observed in the Ni-based active material of Example 1 when compared with the Ni-based active material of Comparative Example 2 as shown in FIGS. 3A and 3B respectively. Particularly, as shown in FIG. 3C, the $PO_3$ peak was related to the P component in the Ni-based active material of Example 1

Example 1 was greater than that of the Ni-based active material of Comparative Example 2 by about 5 times. In addition, referring to FIGS. 3C and 3D, although P was detected in the inner portion of the Ni-based active material of Example 1, the ratio of the peak intensity related to P in the inner portion of the Ni-based active material to that in the outer portion of the Ni-based active material was in a range of 1:2 to 1:4, for example, 1:2.2, indicating that a relatively low intensity was observed in the porous inner portion compared to the shell portion and the surface. In this regard, the inner portion of the Ni-based active material includes the porous core portion and the shell portion (e.g., part of the shell portion), and the outer portion indicates the surface of the secondary particle. In FIG. 3C, the P compound observed in the Ni-based active material of Comparative Example 1 corresponds to noise.

Figure 4A:
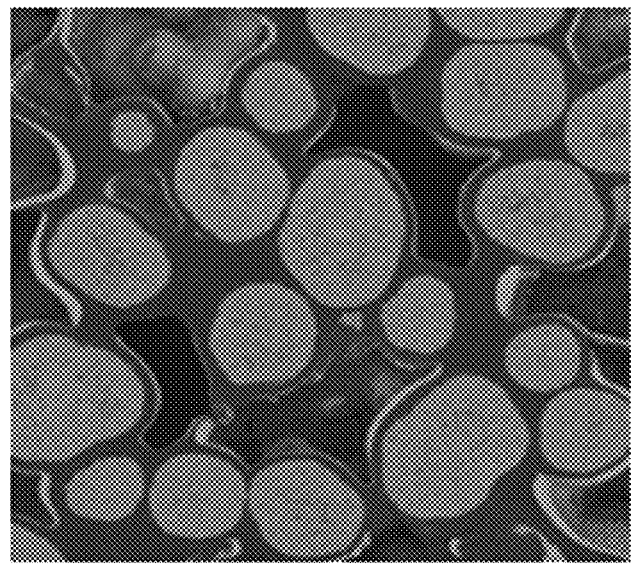
FIG. 4A shows an SEM image of a cross-section of a P-coated Ni-based active material.
Figure 4B:
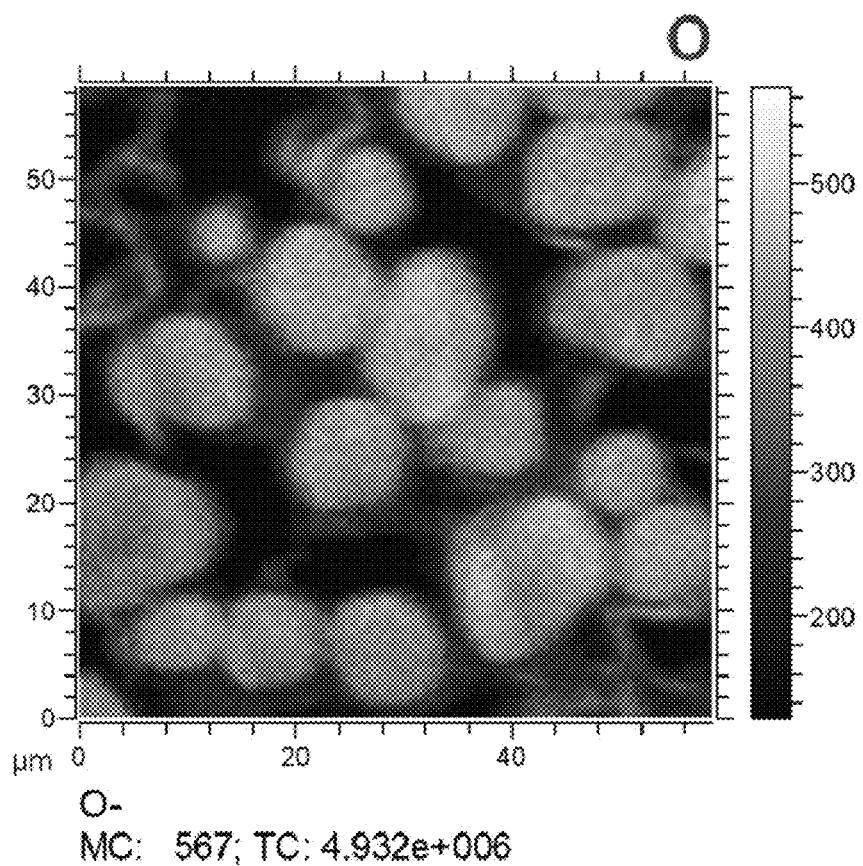
FIG. 4B shows TOF-SIMS chemical mapping results of oxygen on cross-section of the P-coated active material.
Figure 4C:
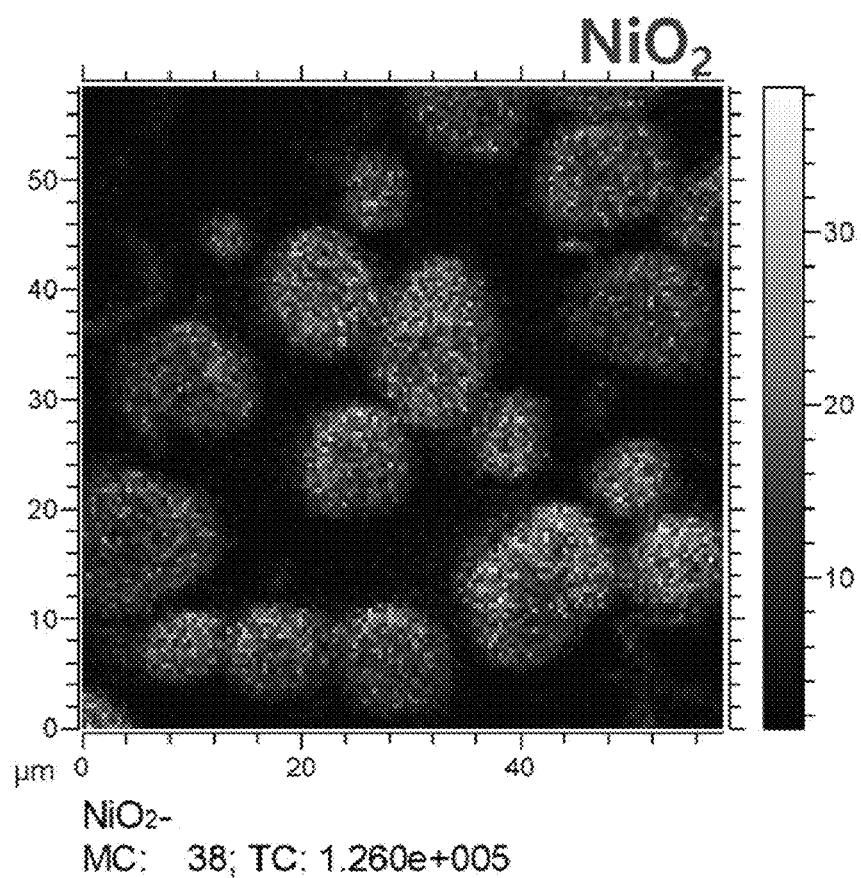
FIG. 4C shows TOF-SIMS chemical mapping results of $NiO_2$ on cross-section of the P-coated active material.
Figure 4D:
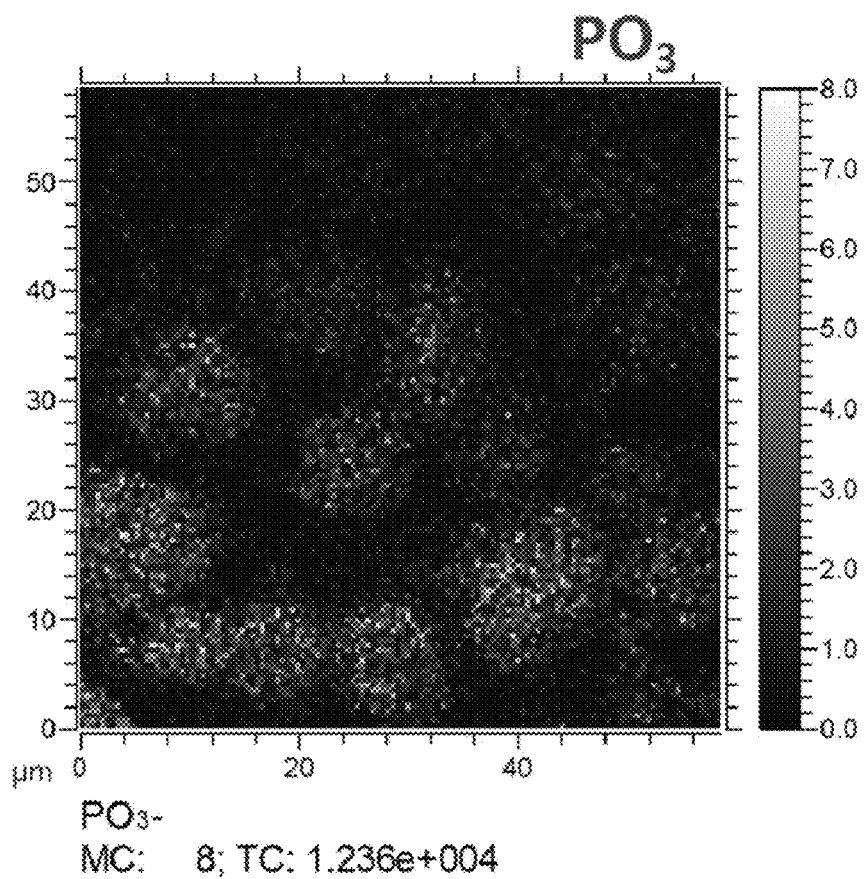
FIG. 4D shows TOF-SIMS chemical mapping results of $PO_3$ on cross-section of the P-coated active material.

In addition, FIGS. 4A to 4D show TOF-SIMS chemical mapping results of cross-sections of the Ni-based active materials of Example 1. FIG. 4A shows an SEM image of a cross-section of a P-coated Ni-based active material. FIGS. 4B to 4D show TOF-SIMS chemical mapping results of cross-sections of P-coated active materials. FIG. 4B shows mapping results of oxygen, FIG. 4C shows mapping results of $NiO_2$, and FIG. 4D shows mapping results of $PO_3$.

Referring to FIGS. 4A to 4D, it may be confirmed that, as in the cross-section analysis results, when P is coated on the precursor by impregnation/adsorption and then the active material is prepared, P is detected in the inner portion as well as the surface.

Also, the Ni-based active material precursor of Preparation Example 1 was subjected to TOF-SIMS analysis.

As a result of analysis, the Ni-based active material precursor of Preparation Example 1 had the same TOF-SIMS results as those of the above-described Ni-based active material. Thus, the ratio of the peak intensity related to P in the inner portion of the Ni-based active material precursor to that in the outer portion of the Ni-based active material precursor was in a range of 1:2 to 1:4, for example, 1:2.2, indicating that a relatively low intensity was observed in the porous inner portion compared to the shell portion and the surface.

Evaluation Example 3: SEM-EDX Analysis

Figure 5A:
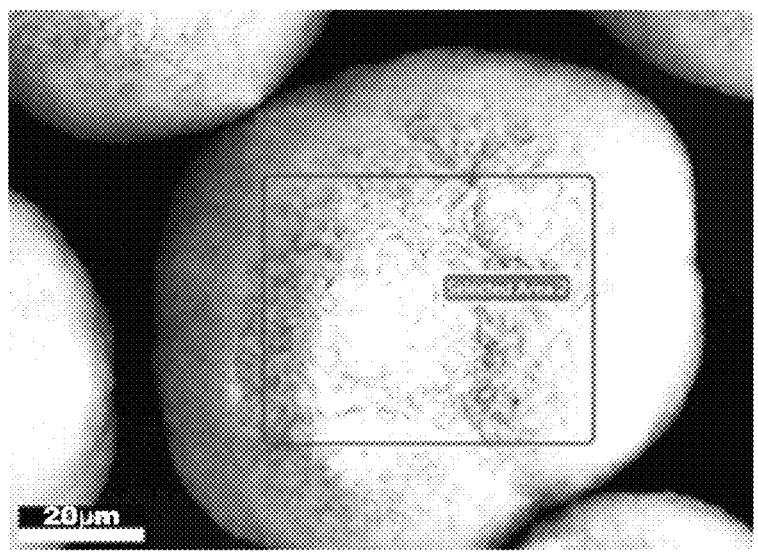
FIG. 5A shows a scanning electron microscope-energy dispersive X-ray Spectroscopy (SEM-EDX) image of a Ni-based active material precursor of Preparation Example 1.
Figure 5B:
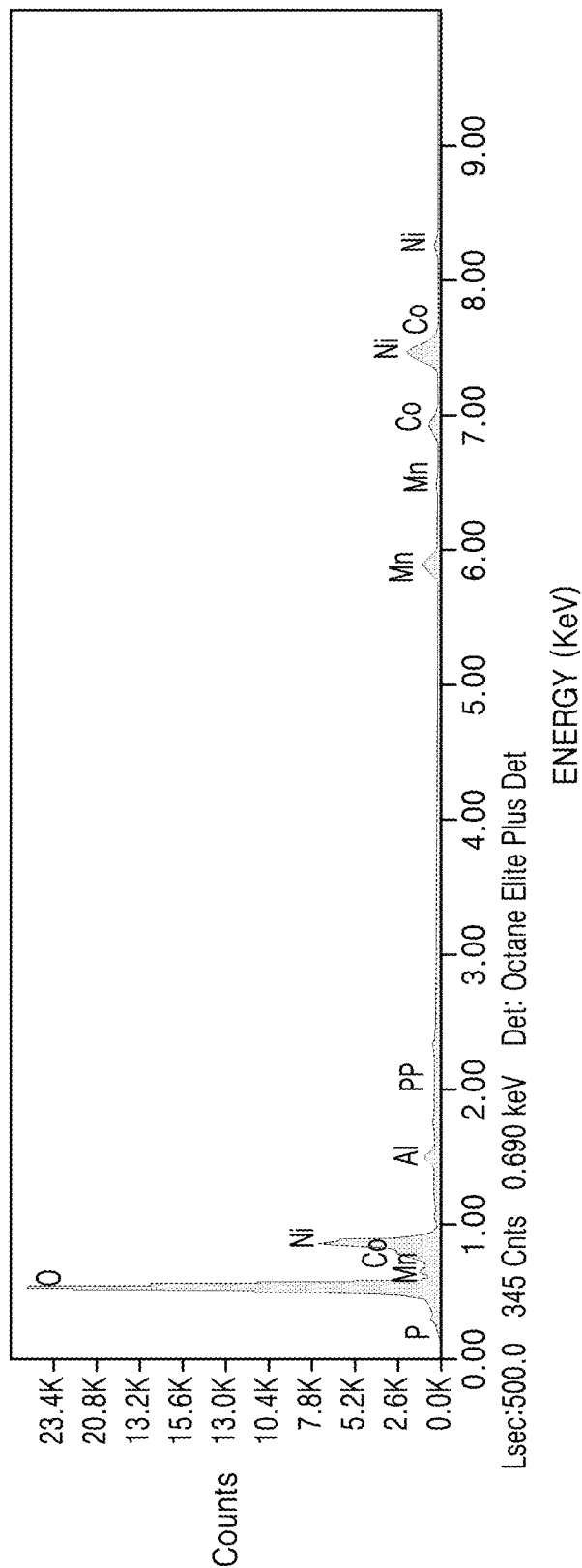
FIG. 5B shows the scanning electron microscope-energy dispersive X-ray Spectroscopy (SEM-EDX) results of the Ni-based active material precursor of Preparation Example 1.

The Ni-based active material precursor of Preparation Example 1 was subjected to scanning electron microscope-energy dispersive X-ray Spectroscopy (SEM-EDX), and the results are shown in FIGS. 5A and 5B.

FIGS. 5A and 5B show SEM-EDX results of the Ni-based active material precursor of Preparation Example 1. FIG. 5B shows EDX analysis results of a rectangular area of FIG. 5A. Components of a film formed by phosphoric acid were detected in the Ni-based active material precursor of Preparation Example 1 as shown in FIG. 5B, and phosphorus was detected as a component.

Evaluation Example 4: Initial Charge Efficiency (I.C.E)

The coin cells manufactured according to Manufacture Example 1 and Comparative Manufacture Example 1 were each charged and discharged once at 25° C. at 0.1 C to proceed (e.g., conduct) formation. Subsequently, charging-discharging was performed once at 0.1 C to confirm initial charge-discharge characteristics. During charging, the coin cells were each set such that a constant current (CC) mode was utilized in the beginning, which was converted into a constant voltage (CV) mode later, and the coin cells were cut off at 4.3 V and 0.05 C. During discharging, the coin cells were each set such that the coin cells were each cut off at 3.0 V at the constant current (CC) mode. Initial charge efficiency (I.C.E) were measured according to Equation 1 below, and the results thereof are given in Table 1 below.

$$\text{Initial Charge Efficiency [\%]} = [\text{discharge capacity at } 1^{st} \text{ cycle/charge capacity at } 1^{st} \text{ cycle}] \times 100 \quad \text{Equation 1}$$

TABLE 1

| Example | Charge capacity (mAh/g) | Discharge capacity (mAh/g) | I.C.E (%) |
|---|---|---|---|
| Manufacture Example 1 | 208.41 | 200.40 | 96.2 |
| Comparative Manufacture Example 1 | 209.38 | 201.37 | 96.2 |

As shown in Table 1, the coin cell manufactured according to Manufacture Example 1 had charge-discharge efficiency (initial characteristics) and initial discharge capacity similar to those of the coin cell prepared in Comparative Manufacture Example 1. However, as shown in Evaluation Examples 5 and 6 below, the coin cell of Manufacture Example 1 had improved high-rate characteristics and lifespan characteristics compared to that of Comparative Manufacture Example 1.

Evaluation Example 5: High-Rate Characteristics

The coin cells manufactured according to Manufacture Example 1 and Comparative Manufacture Examples 1 and 2 were each charged at a constant current of 0.2 C and a constant voltage of 4.3 V (0.05 C cut-off), rested for 10 minutes, and discharged at a constant current of 0.2 C, 0.33 C, 0.5 C, 1 C, 2C, or 3 C) until the voltage reached 3.0 V. That is, rate capability of each coin cell was evaluated while periodically changing the discharge rate at 0.2 C, 0.33 C, 0.5 C, 1 C, 2 C, or 3 C as the number of charging and discharging cycles increases. However, during the first to third charging and discharging, the cell was discharged at a rate of 0.1 C. In this regard, rate capability is obtained by Equation 2 below.

$$\text{Rate property (\%)} = (\text{discharge capacity when cell is discharged at a specific constant current})/(\text{discharge capacity when cell is discharged at a rate of 0.1 C}) \times 100 \quad \text{Equation 2}$$

High-rate characteristics evaluation results are shown in Table 2 below.

TABLE 2

| | Capacity (mAh/g) | | | | | |
|---|---|---|---|---|---|---|
| Example | 0.2 C | 0.33 C | 0.5 C | 1 C | 2 C | 3 C |
| Manufacture Example 1 | 198.42 | 195.98 | 193.56 | 187.82 | 180.15 | 174.35 |
| Comparative Manufacture Example 1 | 199.33 | 196.87 | 194.36 | 188.58 | 180.68 | 173.75 |

Referring to Table 2, the coin cell of Manufacture Example 1 had increased high-rate characteristics compared to the coin cell manufactured in Comparative Manufacture Example 1.

The high-rate characteristics of the coin cell of Comparative Manufacture Example 2 were evaluated in the same manner as in the above-described method of evaluating the charge-discharge efficiency of Manufacture Example 1.

As a result of evaluation, the coin cell of Comparative Manufacture Example 2 had the same discharge amount as that of the coin cell of Comparative Manufacture Example 1 but a slightly increased charge-discharge efficiency due to a decreased charge amount. However, the coin cell of Comparative Manufacture Example 2 showed deteriorated lifespan characteristics at high temperature as described in Evaluation Example 6 below.

Evaluation Example 6: Lifespan Characteristics at High Temperature

The coin cells manufactured according to Manufacture Example 1 and Comparative Manufacture Examples 1 and 2 were each charged and discharged once at 0.1 C to proceed (e.g., conduct) formation. Subsequently, charging-discharging was performed once at 0.2 C to confirm initial charge-discharge characteristics. Cycle characteristics were observed by repeating charging and discharging 50 times at 45° C. and 1 C. During charging, the coin cells were each set such that a constant current (CC) mode was utilized in the beginning, which was converted into a constant voltage (CV) mode, and the coin cells were each cut off at 4.3 V and 0.05 C. During discharging, the coin cells were each set such that the coin cells were each cut off at 3.0 V at the constant current (CC) mode. This cycle was repeated 80 times. Changes in discharge capacity with respect to the number of cycles are shown in FIG. 6.

Figure 6:
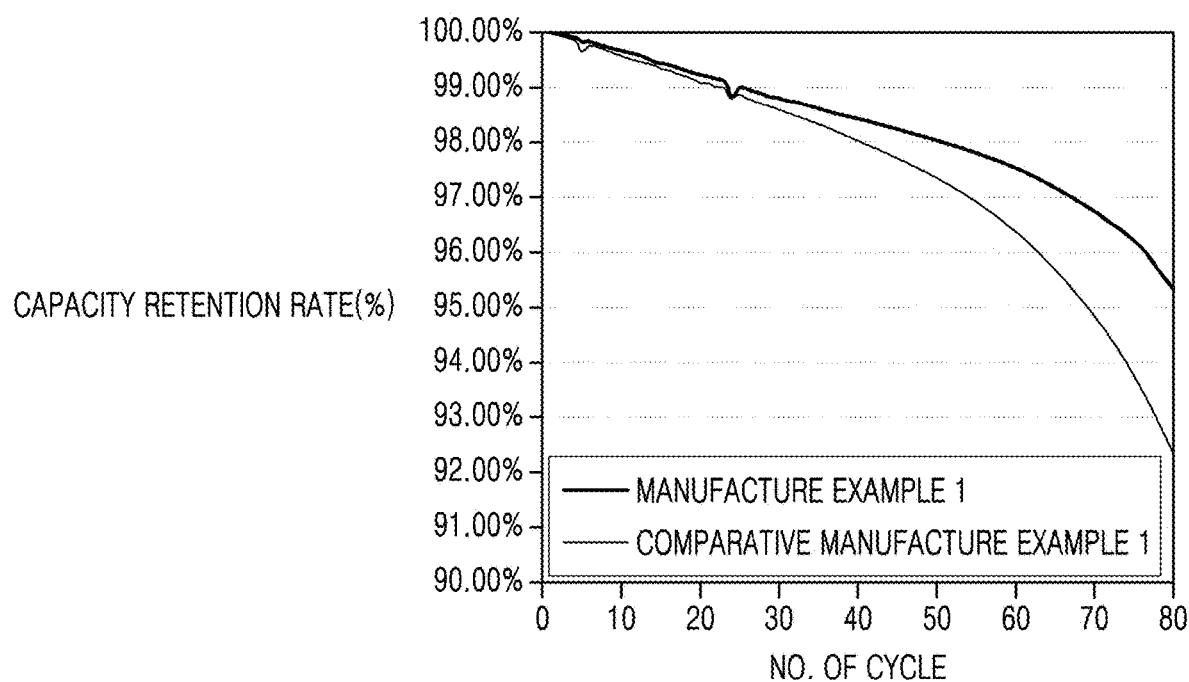
FIG. 6 shows lifespan characteristics of coin cells of Manufacture Example 1 and Comparative Manufacture Example 1.

Referring to FIG. 6, it can be seen that the coin cell of Manufacture Example 1 had improved lifespan characteristics compared to that of Comparative Manufacture Example 1.

Lifespan characteristics of the coin cell of Comparative Manufacture Example 2 at high temperature were evaluated in the same manner as the evaluation method of the charge-discharge efficiency of the coin cell of Manufacture Example 1.

As a result of evaluation, the coin cell of Comparative Manufacture Example 2 has lifespan characteristics at high temperature less than those of the coin cell of Comparative Manufacture Example 1 by about 1%.

Evaluation Example 7: Gas Generation

The lithium secondary batteries prepared in Manufacture Example 1 and Comparative Manufacture Example 1 were each charged and discharged 50 times at a high temperature (60° C.) at a driving voltage of 3 V to 4.4 V under the conditions of 0.5 C/1 C, and the volume of gas generated in the batteries was measured. The results are shown in FIG. 7.

Figure 7:
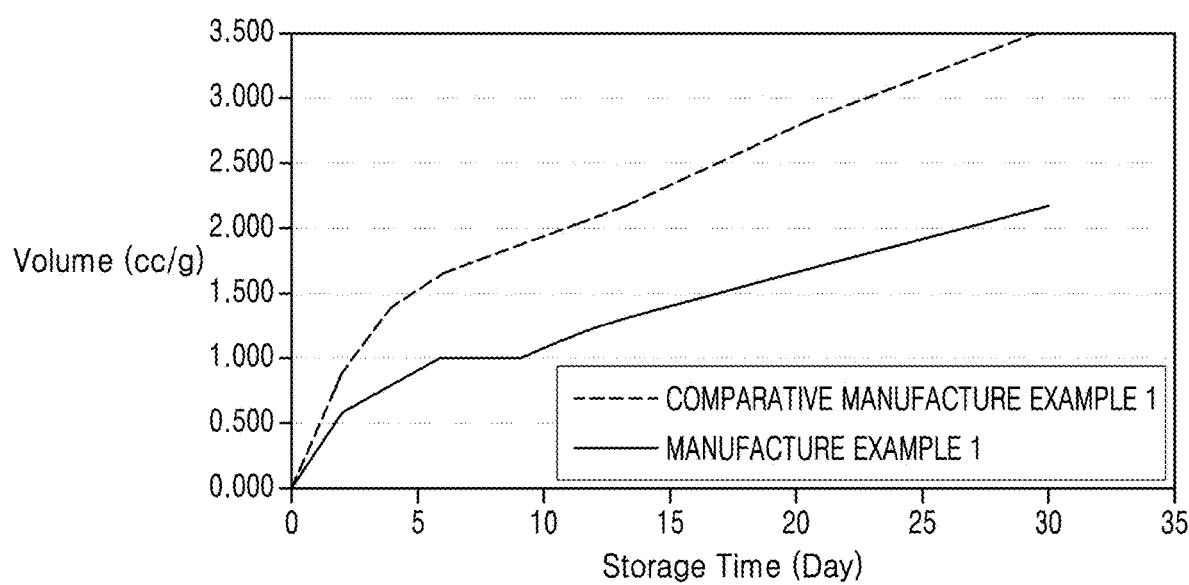
FIG. 7 shows a graph illustrating volumes of gas generated in lithium secondary batteries prepared in Manufacture Example 1 and Comparative Manufacture Example 1 measured after charging and discharging at a high temperature.

Referring to FIG. 7, the coin cell of Manufacture Example 1 showed far (significantly) less gas generation than the coin cell of Comparative Manufacture Example 1 prepared utilizing the Ni-based active material not including lithium phosphate as a positive active material.

Evaluation Example 8: Measurement of Porosity and Pores Size of Ni-Based Active Material in Inner and Outer Portions Porosity and pore size were measured in inner portions and outer portions of the Ni-based active material particles prepared according to Example 1 and Comparative Examples 5 and 6. In this regard, the porosity and the pore size were evaluated utilizing SEM images of cross-sections of the active materials. A Magellan 400L (FEI company) was utilized as the scanning electron microscope. Cross-sections of samples were pretreated by milling at 6 kV and 150 μA for 4 hours utilizing a CP2 manufactured by JEOL. The SEM image analysis was performed at 350 V under the conditions of 3.1 pA SE.

The analysis results are shown in Table 3 below.

TABLE 3

| Example | Porosity of inner portion | Porosity of outer portion | Pore size of inner portion (nm) | Pore size of outer portion (nm) |
|---|---|---|---|---|
| Example 1 | 30 | 2 | 500 | 30 |
| Comparative Example 5 | 2 | 2 | 30 | 30 |
| Comparative Example 6 | 2 | 20 | 30 | 30 |

Based on Table 3, it was confirmed that the inner portion had irregular closed pores distributed therein and the outer portion had less pores and a denser structure than the inner portion in the Ni-based active material prepared according to Example 1 in comparison with the Ni-based active material prepared according to Comparative Example 6. On the contrary, it was confirmed that in the Ni-based active material of Comparative Example 6, the inner portion had a lower porosity and pores were mainly distributed in the outer portion of the particles.

Referring to the states of plate particles shown in the SEM images of Example 1, average length, average thickness, average ratio (average length/average thickness) were calculated and shown in Table 4 below.

TABLE 4

| Item | Surface | Item | Cross-section |
|---|---|---|---|
| average length (nm) | 290 | average length (nm) | 360 |
| average thickness (nm) | 130 | average thickness (nm) | 150 |
| average ratio | 2.3 | average ratio | 2.9 |

Evaluation Example 9: Net Density of Ni-Based Active Material

Net densities of the Ni-based active materials prepared according to Example 1, Example 7, and Comparative Examples 5 to 7 were measured utilizing a gas pycnometer.

Evaluation results of overall net densities of the Ni-based active materials are shown in Table 5 below.

TABLE 5

| Example | Net density (g/cc) |
|---|---|
| Example 1 | 4.5165 |
| Example 7 | 4.6657 |
| Comparative Example 5 | 4.7613 |
| Comparative Example 7 | 4.7706 |
| Comparative Example 6 | 4.7501 |

Referring to Table 5, it was confirmed that the inner portions of the Ni-based active materials of Examples 1 and 7 had closed pores and the net densities thereof were less than 4.7 g/cc in comparison with the Ni-based active materials of Comparative Examples 5 and 7 which do not include pores. Although the Ni-based active material of Comparative Example 6 had pores, the pores are open pores. In this case, if the open pores were present in the outer portion, the effects of the open pores on the net density were insignificant.

Evaluation Example 10: SEM Analysis

The Ni-based active material particles prepared according to Examples 1 and 7 and Comparative Examples 1 to 3 were analyzed utilizing a SEM. A Magellan 400L (FEI company) was utilized as the SEM. Cross-sections of samples were pretreated by milling at 6 kV and 150 μA for 4 hours utilizing a CP2 manufactured by JEOL. The SEM image analysis was performed at 350 V under the conditions of 3.1 pA SE.

The results of SEM image analysis are shown in 9A to 9E. FIGS. 9A to 9E are SEM images of the Ni-based active materials respectively prepared according to Examples 1 and 7 and Comparative Examples 1, 2, and 3.

Based on the analysis results, it was confirmed that the Ni-based active materials prepared according to Examples 1 and 7 had outer portions denser than inner portions.

On the contrary, the Ni-based active materials prepared according to Comparative Examples 1 and 3 exhibited almost the same density in inner portions and outer portions and had almost no pores (e.g., significantly less pores) in comparison with those of Examples 1 and 2. In addition, it was confirmed that the Ni-based active material prepared according to Comparative Example 2 includes a dense inner portion and a porous outer portion.

By utilizing the Ni-based active material obtained from the Ni-based active material precursor for a lithium secondary battery according to an embodiment, gas generation may be effectively inhibited after charging and discharging of the lithium secondary battery are repeated. In addition, by utilizing the Ni-based active material precursor, lithium ion is easily diffused in the interface between a positive active material and an electrolyte, and a Ni-based active material that allows lithium ions to easily diffuse into the active material may be obtained. Further, it is possible to obtain a nickel-based active material which is easy to intercalate and deintercalated lithium ions and has a short diffusion distance of lithium ions. In the lithium secondary battery manufactured utilizing such a positive active material, the utilization of lithium ions is improved, and the breakage of the active material according to charging and discharging is suppressed to increase capacity and lifetime.

When the Ni-based active material for a lithium secondary battery according to an embodiment is utilized, occurrence of cracks may be suppressed during charging and discharging and the outer portion is densified so that side reactions with the electrolytic solution are suppressed at high temperatures. Therefore, a lithium secondary battery having increased lifespan may be prepared.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various suitable changes in form and details may be made therein without departing from the spirit and scope of the disclosure as defined by the following claims, and equivalents thereof.

What is claimed is:

1. A nickel (Ni)-based active material for a lithium secondary battery, comprising:
   a secondary particle comprising a plurality of particulate structures, each of the plurality of particulate structures comprising:
      a porous core portion; and
      a shell portion comprising a plurality of primary particles radially arranged on the porous core portion; and
   lithium phosphate in the porous core portion, between the plurality of primary particles of the shell portion, and on a surface of the secondary particle,
   wherein the Ni-based active material comprises:
      a porous inner portion comprising the porous core portion; and
      an outer portion comprising the shell portion,
   wherein the porous inner portion comprises closed pores and is less in density than the outer portion, and
   wherein the Ni-based active material has a net density of 4.7 g/cc or less.

2. The Ni-based active material of claim 1, wherein the lithium phosphate is in a range of 0.03 wt % to 0.4 wt % in content based on a total weight of the Ni-based active material.

3. The Ni-based active material of claim 1, wherein the lithium phosphate present on the surface of the secondary particle is greater in content than the lithium phosphate present in the porous core portion and between the plurality of primary particles of the shell portion.

4. The Ni-based active material of claim 1, wherein a ratio of a peak intensity related to phosphorus (P) in the porous core portion and the shell portion to a peak intensity related to phosphorus on the surface of the secondary particle, obtained by time-of-flight secondary ion mass spectrometry (TOF-SIMS) of the Ni-based active material, is in a range of 1:2 to 1:4.

5. The Ni-based active material of claim 1, wherein a volume of the porous inner portion is in a range of 5 vol % to 20 vol % based on a total volume of the Ni-based active material.

6. The Ni-based active material of claim 1, wherein a pore size of the closed pores is in a range of 150 nm to 1 μm in the porous inner portion, and a pore size of pores in the outer portion is less than 150 nm.

7. The Ni-based active material of claim 1, wherein the porous inner portion has a porosity of 3% to 30%, and the porosity of the porous inner portion is at least 1.2 times greater than that of the outer portion.

8. The Ni-based active material of claim 1, wherein the outer portion has a radially arranged structure.

9. The Ni-based active material of claim 1, wherein the Ni-based active material comprises plate particles, and major axes of the plate particles are radially arranged.

10. The Ni-based active material of claim 1, wherein the Ni-based active material is a compound represented by Formula 1 below:

$$Li_a(Ni_{1-x-y-z}Co_xMn_yM_z)O_2, \quad \text{Formula 1}$$

and
   wherein in Formula 1, M is an element selected from boron (B), magnesium (Mg), calcium (Ca), strontium (Sr), barium (Ba), titanium (Ti), vanadium (V), chromium (Cr), iron (Fe), copper (Cu), zirconium (Zr), and aluminum (Al), and
   $0.95 \leq a \leq 1.3$, $x \leq (1-x-y-z)$, $y \leq (1-x-y-z)$, $0 < x < 1$, $0 \leq y << 1$, and $0 \leq z < 1$.

11. The Ni-based active material of claim 10, wherein in Formula 1, $1.0 \leq a \leq 1.3$, $0 < x \leq 0.33$, $0 \leq y \leq 0.5$, $0 \leq z \leq 0.05$, and $0.33 \leq (1-x-y-z) \leq 0.95$.

12. The Ni-based active material of claim 11, wherein the Ni-based active material is $LiNi_{0.6}Co_{0.2}Mn_{0.2}O_2$, $LiNi_{0.5}Co_{0.2}Mn_{0.3}O_2$, $LiNi_{0.33}Co_{0.33}Mn_{0.33}O_2$, $LiNi_{0.8}Co_{0.1}Mn_{0.1}O_2$, or $LiNi_{0.85}Co_{0.1}Al_{0.5}O_2$.

13. A lithium secondary battery comprising:
   a positive electrode comprising the Ni-based active material according to claim 1,
   a negative electrode, and
   an electrolyte therebetween.

14. A nickel (Ni)-based active material precursor for a lithium secondary battery comprising:
   a secondary particle comprising a plurality of particulate structures, each of the plurality of particulate structures comprising:
      a porous core portion; and
      a shell portion comprising a plurality of primary particles radially arranged on the porous core portion; and
   phosphorus (P) in the porous core portion, between the plurality of primary particles, and on a surface of the secondary particle, wherein the phosphorus is in a range of 0.01 wt % to 2 wt % in content based on a total weight of the Ni-based active material precursor,
   wherein the Ni-based active material precursor comprises a porous inner portion comprising the porous core portion, and an outer portion comprising the shell portion;
   the porous inner portion comprises closed pores and is less in density than that the outer portion; and
   the Ni-based active material precursor has a net density of 4.7 g/cc or less.

15. The Ni-based active material precursor of claim 14, wherein phosphorus present on the surface of the secondary particle is greater in content than phosphorus present in the porous core portion and between the primary particles of the shell portion.

16. The Ni-based active material precursor of claim 14, wherein:
   the primary particles comprise plate particles;
   major axes of the plate particles are arranged in a normal direction of the surface of the secondary particle; and
   a thickness-to-length ratio of the plate particles is in a range of 1:2 to 1:20.

17. The Ni-based active material precursor of claim 14, wherein the secondary particle comprises a plurality of particulate structures arranged in a multi-center isotropic array.

18. The Ni-based active material precursor of claim 14, wherein the porous core portion has a pore size of 150 nm to 1 μm and a porosity of 5% to 15%, and the shell portion has a porosity of 1% to 5%.

19. The Ni-based active material precursor of claim 14, wherein the Ni-based active material precursor is a compound represented by Formula 2 below:

$$Ni_{1-x-y-z}Co_xMn_yM_z(OH)_2, \quad \text{Formula 2}$$

and
   wherein, in Formula 2, M is an element selected from boron (B), magnesium (Mg), calcium (Ca), strontium (Sr), barium (Ba), titanium (Ti), vanadium (V), chromium (Cr), iron (Fe), copper (Cu), and zirconium (Zr), and
   $0.3 \leq (1-x-y-z) < 1$, $0 < x < 1$, $0 \leq y < 1$, and $0 \leq z < 1$.

20. The Ni-based active material precursor of claim 19, wherein nickel is in a range of 33 mol % to 95 mol % in content based on a total content of transition metals in the Ni-based active material precursor.

21. The Ni-based active material precursor of claim 14, wherein a ratio of a peak intensity related to phosphorus (P) in the porous core portion and the shell portion of the Ni-based active material precursor to a peak intensity related to phosphorus on the surface of the secondary particle, obtained by time-of-flight secondary ion mass spectrometry (TOF-SIMS) of the Ni-based active material precursor, is in a range of 1:2 to 1:4.

22. A method of preparing the nickel (Ni)-based active material for a lithium secondary battery according to claim 1, the method comprising:
   mixing a lithium precursor and a Ni-based active material precursor to form a mixture, and
   conducting a primary heat treatment on the mixture under an oxidizing gas atmosphere at 600° C. to 800° C.,
   wherein the Ni-based active material precursor comprises:
      a secondary particle comprising a plurality of particulate structures, wherein each of the plurality of particulate structures comprising:
         a porous core portion and a shell portion comprising primary particles radially arranged on the porous core portion; and
         phosphorus (P) in the porous core portion, between the plurality of primary particles, and on the surface of the secondary particle, and
      wherein the phosphorus is in a range of 0.01 wt % to 2 wt % in content based on a total weight of the Ni-based active material precursor,
      wherein the Ni-based active material precursor comprises a porous inner portion comprising the porous core portion, and an outer portion-comprising the shell portion;
      the porous inner portion comprises closed pores and is less in density than that the outer portion; and
      the Ni-based active material precursor has a net density of 4.7 g/cc or less.

23. The method of claim 22, further comprising conducting a secondary heat treatment on the mixture under an oxidizing gas atmosphere at 700° C. to 900° C. after the conducting of the primary heat treatment, wherein the secondary heat treatment is conducted at a higher temperature than the primary heat treatment.

24. The method of claim 22, further comprising pretreating the mixture of the lithium precursor and the Ni-based active material precursor under an oxidizing gas atmosphere at 400° C. to 700° C. for 1 hour to 3 hours prior to the conducting of the primary heat treatment.

25. The method of claim 22, wherein the Ni-based active material precursor is prepared by:
   a first act of supplying a feedstock at a first feed rate and stirring the feedstock to form a precursor seed;
   a second act of supplying the feedstock to the precursor seed formed in the first act at a second feed rate and stirring the feedstock to grow the precursor seed;
   a third act of supplying the feedstock to the precursor seed grown in the second act at a third feed rate and stirring the feedstock to adjust a growth of the precursor seed to obtain a product; and
   obtaining a phosphorus-containing Ni-based active material precursor by washing the product obtained in the third act to obtain a washed product of a preliminary Ni-based active material precursor, and supplying an ionizable phosphorus compound to the washed product of the preliminary Ni-based active material precursor,
   wherein the feedstock comprises a complexing agent, a pH adjusting agent, and a metal raw material for forming the Ni-based active material precursor, and
   the second feed rate of the metal raw material for forming the nickel-based active material precursor is greater than the first feed rate, and the third feed rate is greater than the second feed rate.

26. The method of claim 25, wherein the ionizable phosphorus compound is $H_3PO_4$, $NH_3PO_4$, $NH_4HPO_4$, $NH_4H_2PO_4$, or any combination thereof.

27. The method of claim 25, wherein the obtaining of the phosphorus-containing Ni-based active material precursor by supplying the ionizable phosphorus compound to the washed product of the preliminary Ni-based active material precursor comprises impregnating the washed product of the preliminary Ni-based active material precursor in a mixture of an ionizable water-soluble phosphorus-containing compound and a solvent.

28. The method of claim 25, wherein a stirring power of the mixture is sequentially decreased in the order of the first act, the second act, and the third act.

\* \* \* \* \*

UNITED STATES PATENT AND TRADEMARK OFFICE
CERTIFICATE OF CORRECTION

| | |
|---|---|
| PATENT NO. | : 11,456,458 B2 |
| APPLICATION NO. | : 17/183295 |
| DATED | : September 27, 2022 |
| INVENTOR(S) | : Doyu Kim et al. |

It is certified that error appears in the above-identified patent and that said Letters Patent is hereby corrected as shown below:

On the Title Page

Column 1, (30) Foreign Application Priority Data, Line 1

Below "Foreign Application Priority Data"
Insert -- Dec. 8, 2016 (KR) ........................ 10-2016-0166888
Dec. 7, 2017 (KR) ........................ 10-2017-0167526 --

In the Claims

Column 38, Line 1, Claim 10

Delete "$0 \leq y \ll 1$," and
Insert -- $0 \leq y < 1$, --

Signed and Sealed this
Twentieth Day of August, 2024

Katherine Kelly Vidal
*Director of the United States Patent and Trademark Office*